April 5, 1966 A. ZAROUNI 3,244,814

COMMUNICATION SYSTEM

Filed March 14, 1963 23 Sheets-Sheet 1

INVENTOR
A. ZAROUNI
BY [signature]
ATTORNEY

April 5, 1966 A. ZAROUNI 3,244,814
COMMUNICATION SYSTEM
Filed March 14, 1963 23 Sheets-Sheet 2

April 5, 1966 A. ZAROUNI 3,244,814

COMMUNICATION SYSTEM

Filed March 14, 1963 23 Sheets-Sheet 4

INCOMING TRUNK 1

INCOMING TRUNK 1

April 5, 1966 | A. ZAROUNI | 3,244,814

COMMUNICATION SYSTEM

Filed March 14, 1963 | 23 Sheets-Sheet 12

FIG. 12 READ-OUT CONTROL

April 5, 1966 A. ZAROUNI 3,244,814

COMMUNICATION SYSTEM

Filed March 14, 1963

23 Sheets-Sheet 14

April 5, 1966 A. ZAROUNI 3,244,814

COMMUNICATION SYSTEM

Filed March 14, 1963 23 Sheets-Sheet 15

FIG. 16 OUTGOING TRUNK SELECTOR

April 5, 1966 A. ZAROUNI 3,244,814

COMMUNICATION SYSTEM

Filed March 14, 1963 23 Sheets-Sheet 18

April 5, 1966 A. ZAROUNI 3,244,814

COMMUNICATION SYSTEM

Filed March 14, 1963

23 Sheets-Sheet 19

April 5, 1966 | A. ZAROUNI | 3,244,814

COMMUNICATION SYSTEM

Filed March 14, 1963 | 23 Sheets-Sheet 20

April 5, 1966 A. ZAROUNI 3,244,814

COMMUNICATION SYSTEM

Filed March 14, 1963 23 Sheets-Sheet 22

April 5, 1966 A. ZAROUNI 3,244,814

COMMUNICATION SYSTEM

Filed March 14, 1963 23 Sheets-Sheet 23

3,244,814
COMMUNICATION SYSTEM

Alfred Zarouni, Middletown, N.J., assignor to Bell Telephone Laboratories, Incorporated, New York, N.Y., a corporation of New York Filed Mar. 14, 1963, Ser. No. 265,283
40 Claims. (Cl. 179—18)

The present invention relates generally to communication systems and more particularly to communication switching systems wherein incoming lines are connectable through a switching network to outgoing lines under the control of address codes received by said incoming lines.

The present invention embodies in the incoming lines a maximum amount of control, with a minimum quantity of control relegated to being common to such lines, thereby enabling the control portion of the system to grow at substantially the same rate as the number of incoming lines.

Most modern communication switching systems of any substantial size, such as may be found in the telephone field, utilize a maximum amount of control concentrated in complex circuits used in common by lines, trunks, et cetera. It has been found economical in large systems to use this common control feature; however, in relatively small installations such complexity of common control is definitely disadvantageous from the cost standpoint. For this reason, for the most part, switching systems are generally engineered according to the size of the installation, with the extent of common control varying from a small, simple amount for small exchanges or offices to a large, complex amount for the large offices. In such common control systems, the incoming and outgoing facilities, whether they be lines or trunks or the like, generally remain fairly simple so as to include only those means necessary to supervise the status of the connection, to implement signaling, to enable transmission, and to repeat messages.

It is the main object of the present invention to enable wide economical latitude in the size of a communication switching system.

This main object is attained by embodying in the incoming lines all controls necessary for receiving multidigit address codes identifying the values of the digits, ascertaining when a full code has been received, initiating action to select an outgoing line according to the address code and to connect the two lines together, transmitting the code over the established connection, and monitoring the connection.

In attaining this main object, the invention employs a limited amount of common control to provide temporary storage of code signals and to select an outgoing line.

The herein disclosed exemplary embodiment of the invention provides a number of incoming trunks and a number of outgoing trunks, a crosspoint network selectively energizable to interconnect incoming and outgoing lines, and control circuitry for effecting such interconnections under the control of seven-bit binary address codes serially received by said incoming lines.

Outgoing trunk selection is accomplished by an outgoing trunk selector which, under the control of a full address code, hunts for and selects an outgoing trunk suitable for connection according to the address code.

Temporary storage of address code bits is accomplished in a memory arrangement comprising a twistor storage device and associated control circuitry whereby data may be stored in the twistor and read-out therefrom.

The interconnection of two trunks over the crosspoint network is on a space-division basis; that is, a continuous, unbroken metallic connection exists once it has been established and until it is released.

Except for the space-division aspect of the completed connection all other control functions are performed under the control of a scan control circuit which allots to each incoming trunk a repetitive and different-discrete-time-slot during which all receiving and transmitting control functions are performed. At the end of each cycle of successive incoming trunk time slots, the scan control provides a time period common to all incoming lines and during which a connection is established.

Each incoming line has a number of control functions to perform:

(1) Detect the bit positions of successively received binary bit signals,
(2) Count the number of bits serially received,
(3) Identify the value of each received bit, positive pulses representing binary ones and negative pulses representing binary zeros,
(4) Cause serial storage of each bit according to bit position and bit value,
(5) Control destructive parallel read-out of all the bits of a stored code for outgoing trunk selection and trunk interconnections,
(6) Cause parallel restorage of all of the bits of the destructive parallel read-out,
(7) Cause destructive serial read-out of stored code bits according to bit position and bit value and transmission thereof to the connected outgoing trunk upon the establishment of the connection,
(8) Monitor the connection of release signals.

According to a general feature of the invention these control functions are mechanized by circuitry within each incoming trunk and thus, except for scan control and outgoing trunk selection and temporary bit storage, as the number of incoming trunks increases, so the amount of control circuitry increases. Outgoing trunk selection circuitry is fixed by the number of codes and outgoing trunks employed. Temporary bit storage circuitry is fixed by the number of bits in a code word (address code) and the number of incoming trunks. Scan control circuitry is fixed by the number of incoming trunks. So, by embodying a maximum of control circuitry in the incoming trunks, the system becomes economical over a very wide range of incoming trunk group size since each added incoming trunk adds most of its needed control.

A particular feature of the invention is the provision of variable bit rate operation. The scan bit rate, which causes time-division scanning of all incoming trunks at a prescribed repetition rate, represents the fastest permissible receiving and transmitting processing bit rate of the system. Trunk receiving functions are performed, within the limits of the scan rate and during the time-slots prescribed thereby, at the rate at which incoming signal bits are received; and, within the aforementioned limits, this incoming bit rate may vary randomly throughout the incoming trunks. Trunk transmitting functions are performed, again within the limits of the scan rate and during the time-slots prescribed thereby, at a rate fixed by bit rate oscillators individual to the incoming trunks; and, again within these limits, this oscillator rate may vary randomly throughout the incoming trunks.

According to the above-mentioned variable bit rate control feature, each incoming trunk includes means for developing incoming bit pulses at the rate of the incoming signal bits; and, the aforementioned bit rate oscillator developes local bit pulses at the oscillator rate. Both the incoming bit pulse rate and the local bit pulse rate are necessarily not faster than the scan pulse repetition rate, and preferably at some convenient rates slower than the scan rate.

A further feature is means whereby the incoming bit rate is rendered exclusively effective to control all receiving functions and the local bit rate is rendered exclusively effective to control all transmitting functions.

A still further feature of the invention is a bit counter in each incoming trunk alternatively controllable by incoming bit pulses and local bit pulses to keep track of bit positions in the serial bit codes during respective receiving and transmitting functions.

An additional feature of the invention is the provision of controls, including the aforementioned bit counter, whereby temporary storage of received bit signals in the twistor store is controlled by the scan control and by the incoming bit pulses according to received bit position and received bit value, and whereby transmission of the stored bit signals from the twistor store is controlled by the scan control and by the local bit pulses according to stored bit position and stored bit value.

These and other features of the present invention will be apparent to those skilled in the art from the following description of the exemplary embodiment taken in connection with the drawing describable briefly as follows.

Figure 2:
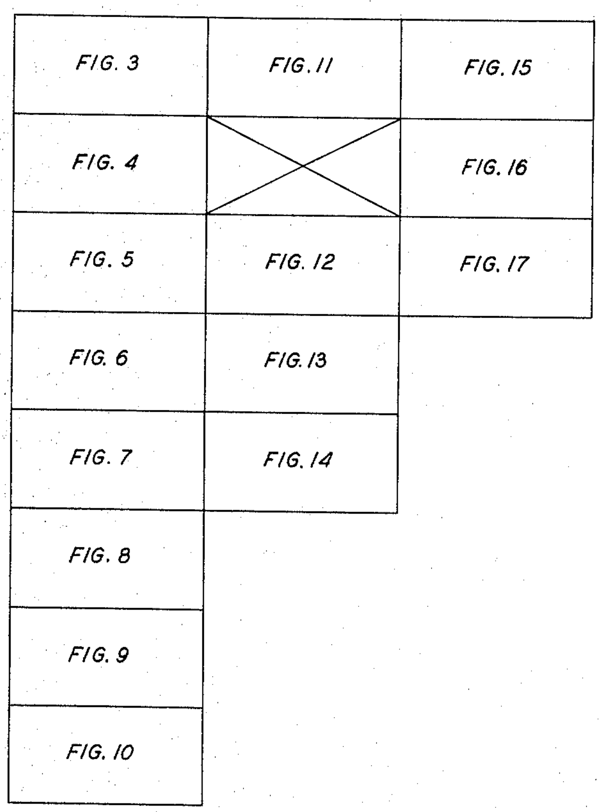
FIG. 2 illustrates the manner in which FIGS. 3 through 17 should be arranged.
Figure 30:
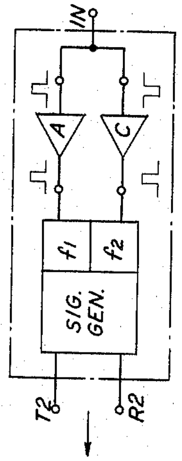
Figure 30A:
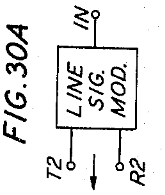
Figure 31:
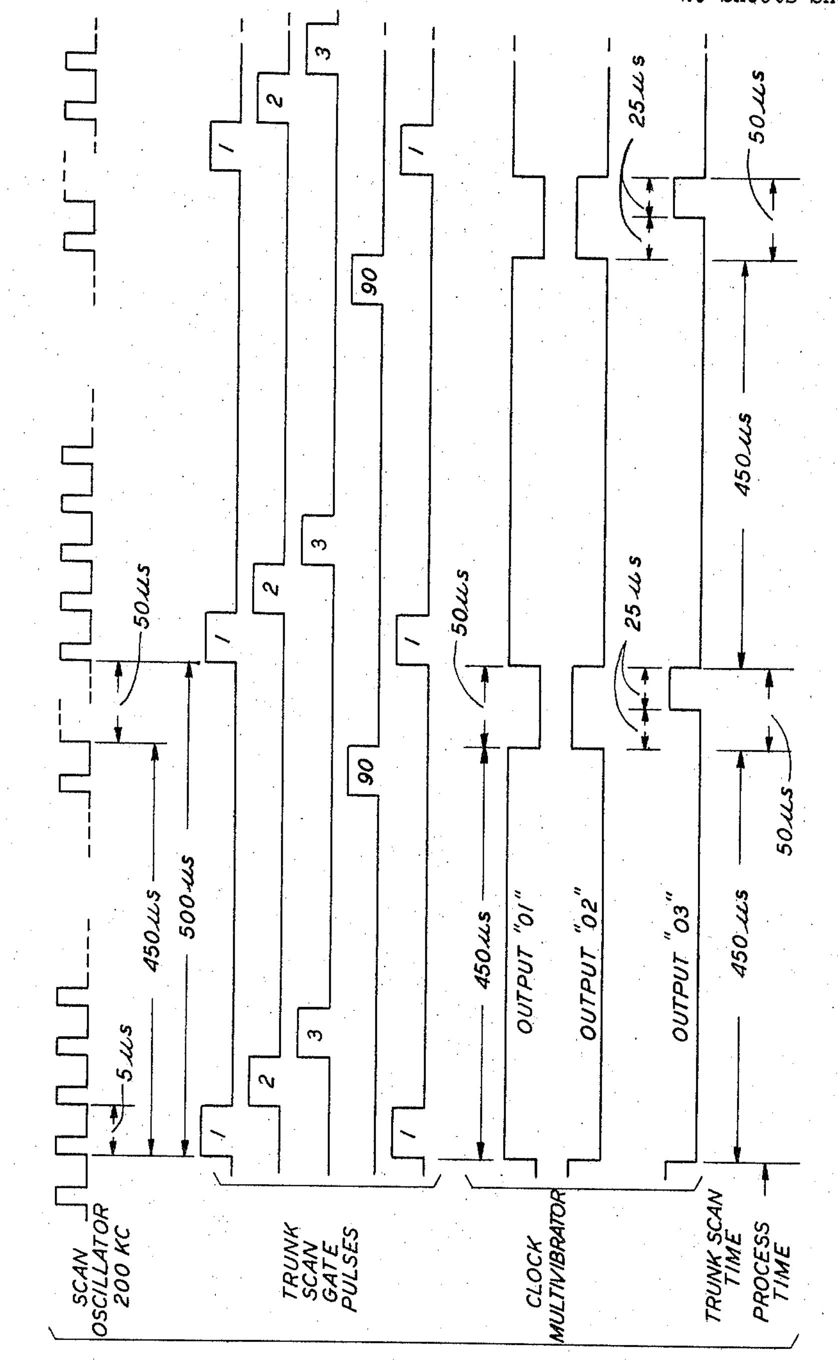
Figure 32:
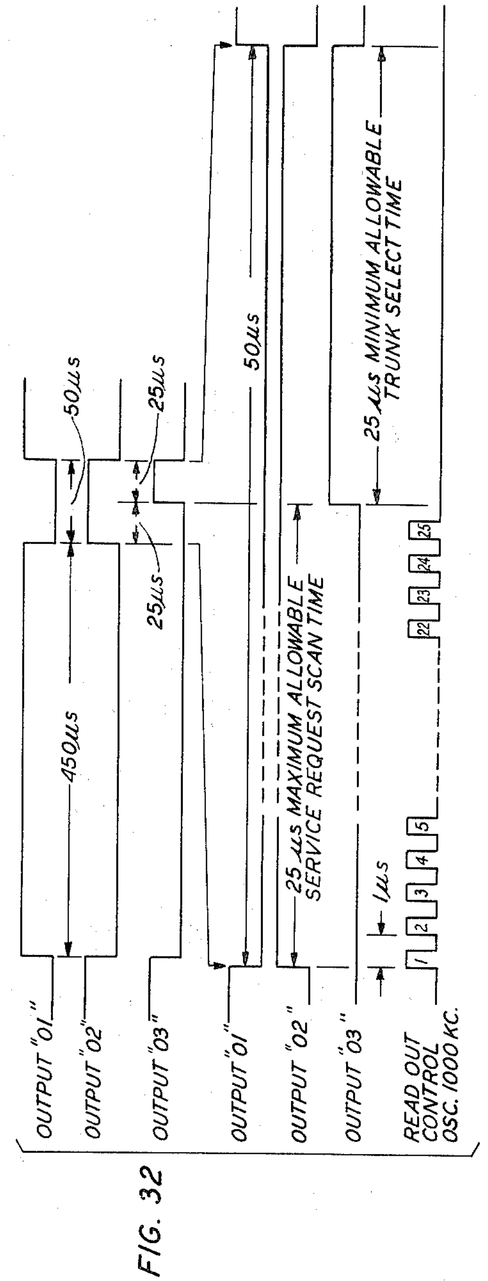
Figure 33:
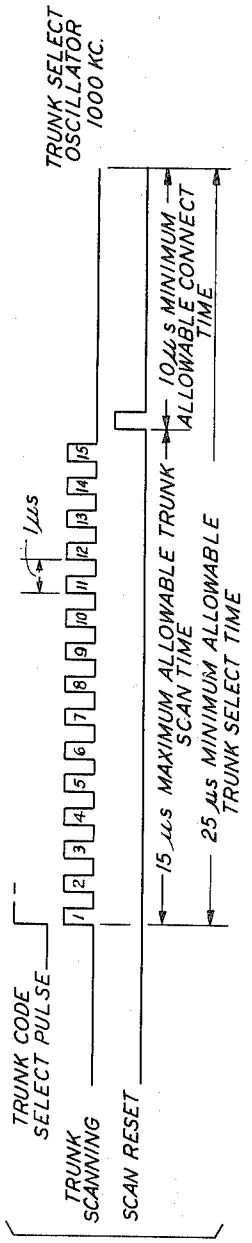

FIGS. 3 through 17, arranged as depicted in FIG. 2, disclose the detailed circuitry of a switching system embodying the features of the invention;

FIGS. 18 through 30A show various circuit arrangements and symbols representative thereof as employed in the detailed system circuitry of FIGS. 3 through 17; and FIGS. 31, 32 and 33 are timing diagrams useful in understanding the time relationships among various control functions in the system.

The description of the exemplary embodiment is organized as follows into main portions and subsections thereof.

A. General Description

B. Symbol Circuitry: AND Gate . . . Regenerative Pulse Amplifier . . . OR Gate . . . Oscillator . . . Clock Multivibrator . . . Network Crosspoint . . . Binary Counter . . . Flip-Flop . . . Transmission Enabling Gate . . . Transmission Inhibiting Gate . . . Ring Counter . . . Line Signal Demodulator . . . Line Signal Modulator C. System Components: Scan Control . . . Incoming Trunk . . . Outgoing Trunk . . . Switching Network . . . Twistor Storage . . . Read-out Control . . . Address Translator . . . Outgoing Trunk Selector D. Detailed Description:
- Assumed Conditions
- Storing Received Address Code—First Digit . . . Intermediate Digits . . . Last Digit
- Outgoing Trunk Selection—Read-out Control . . . Destructive Parallel Read-out and Parallel Restorage . . . Address Translation . . . Outgoing Trunk Selection
- Switching Network Operation—Connection of Trunks . . . Setting Incoming Trunk for Code Transmission . . . Marking Connected Outgoing Trunk as Busy
- Processing Transmitted Address Code—First Digit . . . Intermediate Digits . . . Last Digit . . . Setting Incoming Trunk for Message Transmission
- Message Transmission Start Signal
- Transmission of Message
- Release of Connection

A. GENERAL DESCRIPTION

Figure 1:
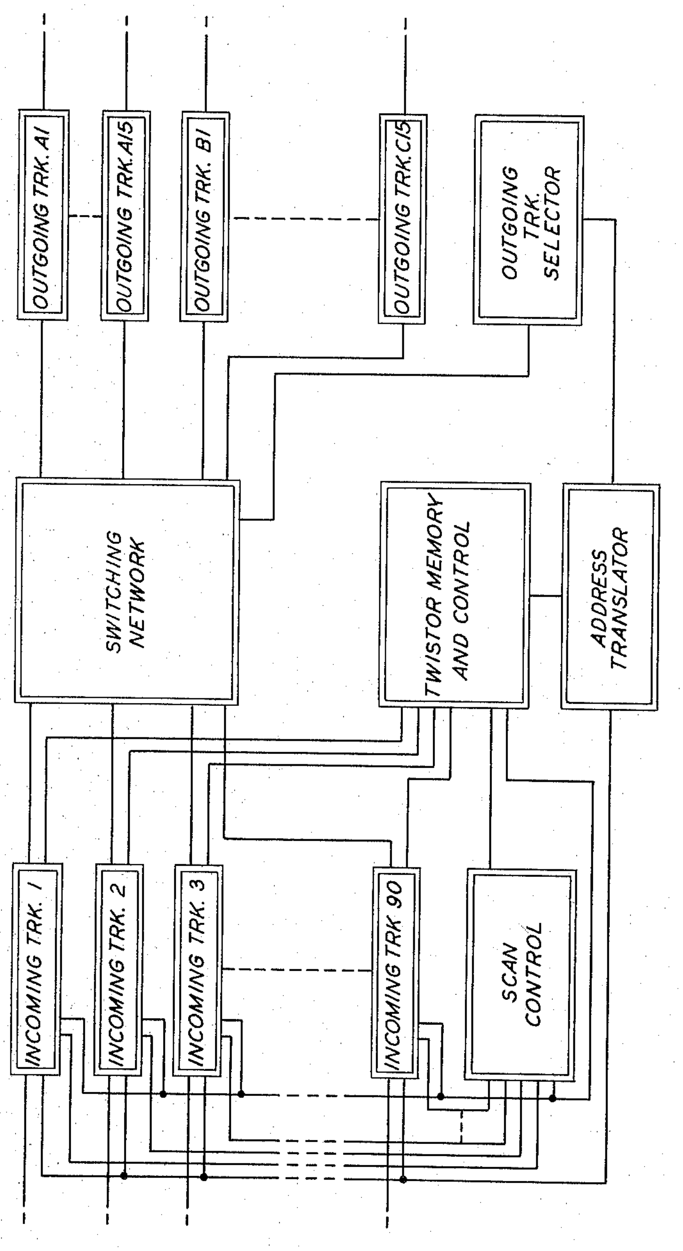
FIG. 1 shows a block diagram of the major components of the disclosed embodiment.

The block diagram of FIG. 1 shows a number of major circuit components arranged in a functional diagram illustrating a communication switching system, such as an intermediate switching exchange or office. Incoming trunks 1 through 90 receive address codes in the form of seven-bit binary words. The code, or word is detected in the incoming trunk as a succession of seven serial binary pulses of positive and negative polarity to represent respective binary ones and binary zeros. The address code is temporarily stored bit-by-bit in a section of the twistor allotted to the incoming trunk. When a full code has been received and stored, the full code is read-out from the twistor into the address translator which initiates action whereby the outgoing trunk selector selects a suitable one of the outgoing trunks A1 through C15. The switching network, which is a rectangular arrangement of metallic crosspoints, is selectively energized to interconnect the two trunks. Thereafter, the incoming trunk causes the stored code to be serially read-out from the twistor and to be transmitted over the connected outgoing trunk to the next switching center. The connection of incoming to outgoing trunk is maintained as a continuous metallic connection until the network is controlled to release the connection.

The control functions of the system are regulated by a common scan control circuit which, in essence, is a pulse clock circuit which provides a cycle of timing pulses consisting of three parts. Referring to FIGS. 31, 32 and 33, the three clock outputs are shown as outputs O1, O2 and O3.

During the time period O1, which is arranged to be 450 microseconds ($\mu$s.), a scanning oscillator (FIG. 10) working at a frequency of 200 kilocycles (kc.) provides 90 successive discrete 5 $\mu$s. pulse intervals. These 90 time-slots are respectively individual to the 90 incoming trunks and all pulse receiving and transmitting functions of any incoming trunk must be performed only during its assigned time slot.

At the end of the O1 time period (after 450 $\mu$s.), the clock output O2 becomes effective and lasts for 50 $\mu$s.: the last 25 $\mu$s. of the time period O2 is designated as clock output O3. At the end of time period O1 all trunk receiving and transmitting functions are stopped and the first 25 $\mu$s. of the period O2 is reserved for scanning incoming trunks to find one which has received and stored a complete code and is requesting outgoing trunk selection service. During this first 25 $\mu$s. period a read-out control oscillator (FIG. 12) working at a frequency of 1000 kc. provides (FIG. 32) 25 successive 1 $\mu$s. pulse intervals arranged to scan up to a maximum of 25 incoming trunks for a service request indication. If such an indication is found before the end of the initial 25 $\mu$s. interval, outgoing trunk selection is begun and the rest of the O2 interval is used to accomplish selection of an outgoing trunk and completion of the connection. The last 25 $\mu$s. of the O2 interval, designated as interval O3, is reserved at any rate as the minimum allowable time for trunk selection and network operation. At the end of the O2 (and O3) interval, the interval O1 is repeated to again enable each incoming trunk to process received or transmitted data bits during its assigned 5 $\mu$s. time slot.

The recurrence rate of a particular incoming trunk time slot is once every 500 $\mu$s. This means that a particular incoming trunk can process received or transmitted data bits at any desired bit rate not exceeding 2000 bits per second. Thus, the incoming bit rates for incoming trunks can be randomly variable from line to line at or under the 2000 bit per second limit. The rates at which incoming trunks transmit data bits over completed connections can also be randomly variable from line to line at or under the 2000 bit per second limit. In the present embodiment, the incoming bit rate is fixed solely by the rate at which the bits are detected by the incoming trunk, while the transmitting bit rate is fixed by an oscillator (FIG. 3) individual to the trunk. There is no necessary correlation or interdependency between these two bit rates.

Figure 10:
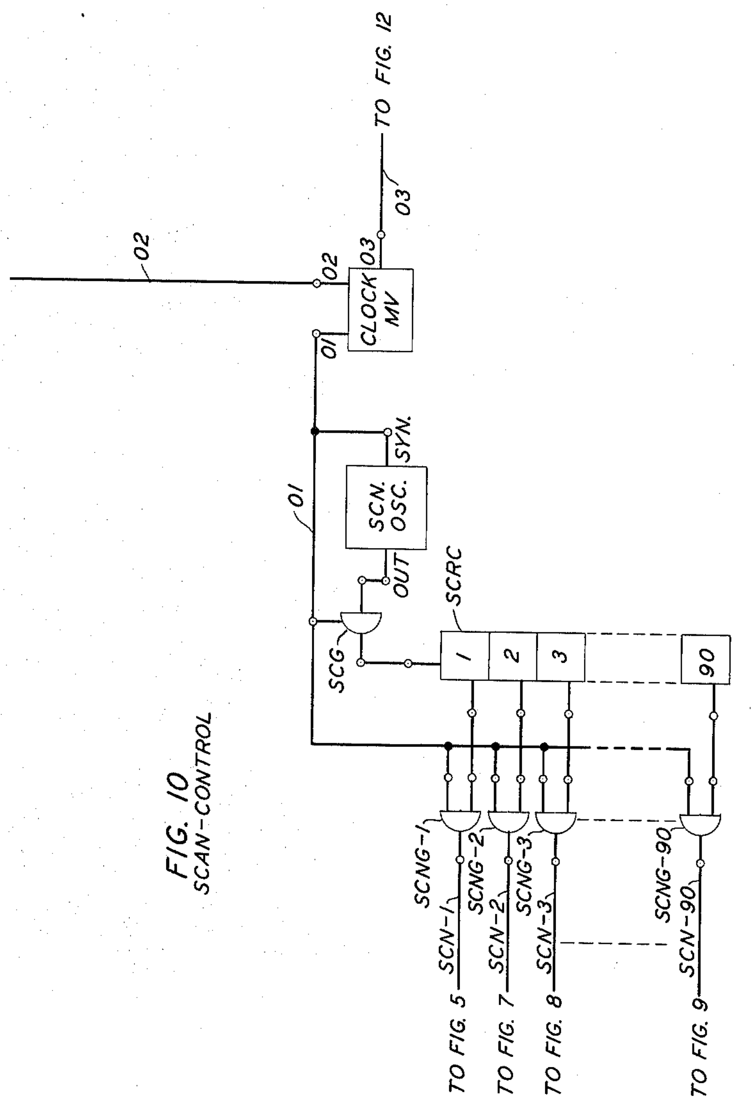

All receiving-processing operations of an unconnected incoming trunk are performed only during its assigned 5 $\mu$s. time slot under the control of the basic scan control circuit of FIG. 10 during time period O1. However, these operations necessarily take place at the incoming bit rate. Briefly, these operations are:

(1) Detecting the bit positions of successively received serial binary bits,
(2) Counting the number of bits serially received,
(3) Identifying the value (one or zero) of each received positive and negative bit pulse,
(4) Causing serial bit-by-bit storage in the twistor of each received bit according to bit position and bit value.

All transmitting-processing operations of a connected incoming trunk are performed only during its assigned 5 μs. time slot under the control of the basic scan control circuit of FIG. 10 during time period O1. However, these operations necessarily take place at the bit rate determined by the oscillator (FIG. 3) individual to the incoming trunk. Briefly, these operations are:

(1) Causing serial bit-by-bit read-out from the twistor of each stored bit according to bit position and bit value,
(2) Causing serial bit-by-bit transmission of positive and negative bit pulses corresponding to the read-out stored bits.

During the O2 time period, when the read-out control (FIG. 12) detects an incoming trunk service request, the incoming trunk causes the complete stored code to be read-out in parallel into the address translator (FIG. 14) to initiate outgoing trunk selection. In the particular embodiment of the twistor used herein any read-out is advantageously destructive read-out due to the temporary nature of the memory arrangement. Since the full code must be available for transmission over the completed connection, the incoming trunk includes means effective incident to the above-mentioned destructive parallel read-out to cause immediate parallel restorage of the code. At a later time, when the incoming trunk is permitted to transmit the code over the connected outgoing trunk, the serial bit-by-bit read-out, again being destructive read-out, clears the memory for that incoming trunk.

After the connection has been established, the incoming trunk is arranged to be non-responsive to any data bits incoming thereto from the originating end and is arranged to be responsive only to a release signal (a multi-bit binary code) from the terminating end comprising the connected outgoing trunk. The established connection, however, permits transmission of message and signaling bits through the incoming trunk; but, these data bits do not affect the connection and do not exercise any control functions within the incoming trunk.

The only data transmitted through a connected incoming trunk and to which it will respond is a release signal from the connected outgoing trunk. This release signal is a prearranged binary code, such as 0110 (negative-positive-positive-negative), and each incoming trunk embodies means for detecting such a four-bit code. The incoming trunk is arranged to disregard all other data transmission. If this specific four-bit code is received from the connected outgoing trunk, the incoming trunk responds thereto to cause release of the connection by de-energizing the crosspoint network. In the meantime, such a release code will have been repeated by the incoming trunk rearward to the originating office or circuitry.

B. SYMBOL CIRCUITRY

Before undertaking a study of the detailed description it is considered advisable to describe exemplary circuitry for implementing the various functional building blocks used in the detailed circuit. FIGS. 18 through 30A illustrate various circuit symbols and suitable specific circuits represented by most of these symbols. Illustrated are such components as AND gate, regenerative pulse amplifiers, OR gate, oscillator, clock multivibrator, network crosspoint, binary counter, flip-flop, transmission enabling gate, transmission inhibiting gate, ring counter, line signal demodulator, and line signal modulator.

Basic direct-current (D.C.) voltages employed throughout the system are related to ground as a common reference potential. Generally, where control pulses are developed they will be of the order of 16 volts amplitude except in those instances where only a matter of a few volts will suffice; and, most D.C. levels throughout the system vary between negative 24 volts and negative 8 volts, with a few exceptions. All reference to D.C. voltage levels, unless otherwise qualified, means negative with respect to ground.

*AND gate*

Figure 18:
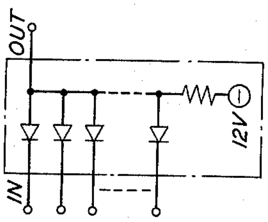
Figure 18A:
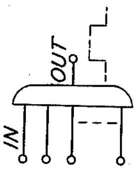

FIG. 18 shows the circuitry of an AND gate for which the symbol is shown in FIG. 18A. This AND gate is arranged so that with all inputs at minus 24 volts D.C. (24 v. D.C.) the output will be at 24 v. D.C., with less than all of its inputs at minus 8 volts D.C. (8 v. D.C.) the output will be at 24 v. D.C., and with all of its inputs at 8 v. D.C. the output will be at 8 v. D.C. Thus, for the length of time that all inputs are concurrently at 8 v. D.C., the output delivers a 16 volt positive going pulse.

*Regenerative pulse amplifier*

Figure 19:
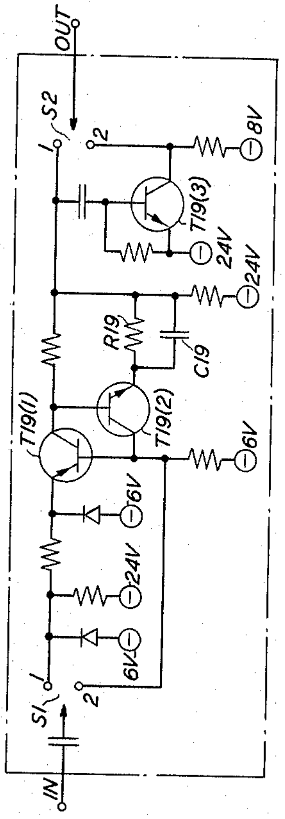

FIG. 19 shows circuitry of a regenerative pulse amplifier which may be settable into various conditions depending upon the setting of switches S1 and S2. This amplifier, due to its capacitive input, accepts pulse inputs; and, due to the nature of its circuitry, the amplifier is responsive to an input pulse to provide a D.C. output pulse of a predetermined pulse width.

Figure 19C:
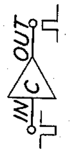
Figure 19B:
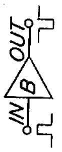
Figure 19A:

With switch S1 set in position 1 and switch S2 set in position 1 the circuit is arranged as an A type amplifier, shown in FIG. 19A, where output is normally at 24 v. D.C. and which is responsive only to positive pulse input to change its output to 8 v. D.C. for a measured pulse width.

With switch S1 set in position 1 and switch S2 set in position 2 the circuit is arranged as a B type amplifier, shown in FIG. 19B, where output is normally at 8 v. D.C. and which is responsive only to positive pulse input to change its output to 24 v. D.C. for a measured pulse width.

With switch S1 set in position 2 and switch S2 set in position 1 the circuit is arranged in a C type amplifier, shown in FIG. 19C, whose output is normally at 24 v. D.C. and which is responsive only to negative pulse input to change its output to 8 v. D.C. for a measured pulse width.

Normally, the PNP type transistor T19 (1) and the NPN type transistors T19 (2) and T19 (3) are all cut-off, thereby causing switch S2 to have its terminal 1 set at 24 v. D.C. and its terminal 2 set at 8 v. D.C. Wherever a positive going pulse is applied to terminal 1 of switch S1 or a negative going pulse is applied to terminal 2 of switch S1, transistors T19 (1) and T19 (2) are made conducting. This causes terminal 1 of switch S2 to change from 24 v. D.C. to 8 v. D.C., which causes transistor T19 (3) to become conducting, in turn causing terminal 2 of switch S2 to change from 8 v. D.C. to 24 v. D.C. In this manner, switch S1 can select the type of pulse input to which the amplifier will respond; and, switch S2 can select the desired type of pulse output. The duration of the output pulse is controlled for the most part by the time constant chosen for the timing circuit comprising resistance R19 and capacitance C19. The timing circuit will maintain conduction in transistor T19 (2) even though the input pulse may have ceased. As soon as transistor T19 (2) is cut-off by the decay action of R19 and C19, transistors T19 (1) and T19 (3) will also cut-off, causing terminals 1 and 2 of switch S2 to revert respectively to 24 v. D.C. and 8 v. D.C.

OR gate

Figure 20:
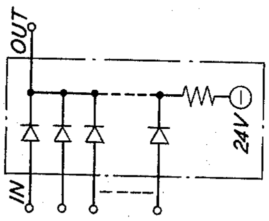
Figure 20A:
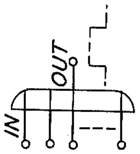

FIG. 20 shows the circuitry of an OR gate for which the symbol is shown in FIG. 20A. The OR gate is arranged so that with all of iits inputs at 24 v. D.C. the output will be at 24 v. D.C., and with any one or more inputs at 8 v. D.C., the output will be at 8 v. D.C. Thus, for the length of time that any one input is at 8 v. D.C., or that any two or more overlapping inputs are at 8 v. D.C., the output delivers a 16 volt positive going pulse.

*Oscillator*

Figure 21:
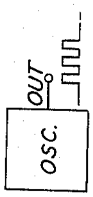

The symbol shown in FIG. 21 is intended to represent any well known circuitry for producing pulse output at a predetermined frequency, pulse width, and pulse shape.

*Clock multivibrator*

Figure 22:
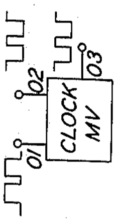

The symbol shown in FIG. 22 is intended to represent any well known circuitry for producing the previously mentioned (FIG. 31) O1, O2 and O3 time intervals where the D.C. level varies between 8 v. D.C. and 24 v. D.C. at the indicated relative times.

*Network crosspoint*

Figure 23:
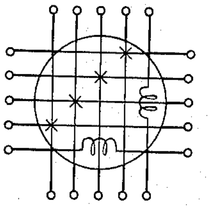

The symbol shown in FIG. 23 illustrates a metallic crosspoint including four horizontal wires, four vertical wires, a horizontal coil and a vertical coil. The intersections of the horizontal and vertical wires represent electrical contacts which are controlled by current in the coils. Functionally, the contacts are initially open; concurrent energization of both coils and of proper polarities is required to close the contacts; once closed, the contacts remain closed or operated magnetically when concurrent energization of both coils ceases; and, reverse energization of either coil alone will release or open the contacts. A suitable structure for performing these functions is disclosed in Patent 3,030,451 to O. D. Jacobson of April 17, 1962. Other suitable structures are known in the art.

*Binary counter*

Figure 24:
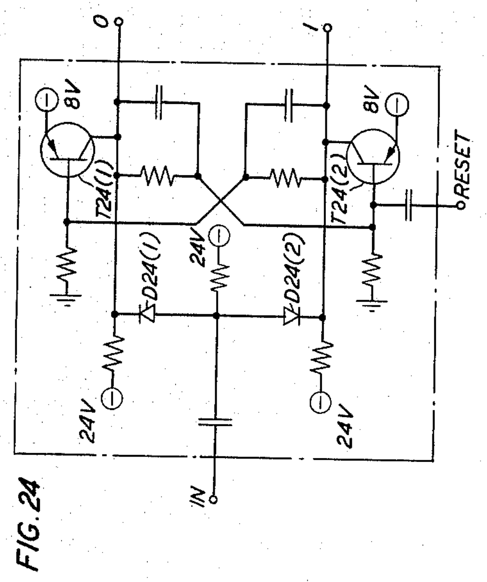
Figure 24A:
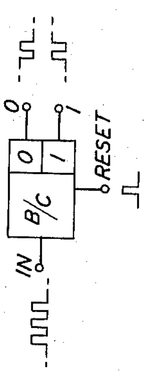

FIG. 24 shows circuitry of a binary counter for which the symbol is shown in FIG. 24A. This circuit is arranged so that when controlled by a positive going reset pulse of a few volts amplitude, the output lead 1 is set at 24 v. D.C. and the output lead 0 is set at 8 v. D.C.: the first positive going input pulse will cause the lead 1 to change to 8 v. D.C. and the lead 0 to change to 24 v. D.C.: the next input pulse will reverse the output voltages again so that lead 1 is set at 24 v. D.C. and lead 0 is set at 8 v. D.C. This process continues for each additional input pulse; and, the counter can be reset at any time.

Normally (having been reset), PNP transistor T24 (1) is conducting and PNP transistor T24 (2) is cut-off. This sets output lead 0 at 8 v. D.C. and output lead 1 at 24 v. D.C. As a result, diode D24 (2) will be forward biased and diode D24 (1) will be reverse biased. To change the situation, a positive input pulse will be passed by diode D24 (2) to the base of transistor T24 (1), thereby cutting it off. When transistor T24 (1) cuts off, its collector will be changed from 8 v. D.C. towards 24 v. D.C. The negative change of the collector of transistor T24 (1) is coupled to the base of transistor T24 (2) and causes the latter to be turned on to be conducting. Transistor T24 (2), in conducting, will cause its collector to change from 24 v. D.C. towards 8 v. D.C.; and this positive change is coupled to the base of transistor T24 (1) to cause the latter to conduct even more. This regenerative action results, in a very short time, in transistor T24 (2) being fully conducting and transistor T24 (1) being fully cut-off. At this time, diode D24 (1) is forward biased, diode D24 (2) is back biased, output 0 is at 24 v. D.C., and output 1 is at 8 v. D.C. The next positive input pulse will reverse the situation again, et cetera. A positive reset pulse will, at any time, cause transistor T24 (2) to be cut-off and transistor T24 (1) to be fully conducting.

*Flip-flop*

Figure 25:
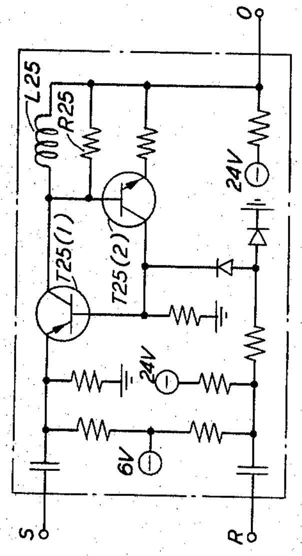
Figure 25A:
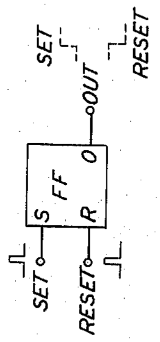

FIG. 25 shows circuitry of a bi-stable flip-flop for which the symbol is shown in FIG. 25A. When controlled by a positive going reset pulse on lead R of a few volts amplitude, the output lead 0 is set at 24 v. D.C.; and, when controlled by a positive going input pulse on lead S, the output lead 0 is set at 8 v. D.C. This circuit is a bistable arrangement which will remain in the condition into which it was last set.

PNP transistor T25 (1) and NPN transistor T25 (2) are both normally (when the circuit is in a reset condition) cut-off whereby the output lead 0 is at 24 v. D.C. A positive input pulse on lead S will cause both transistors T25 (1) and T25 (2) to conduct, causing the output to change from 24 v. D.C. to 8 v. D.C. This status prevails until a positive reset pulse on lead R causes transistors T25 (1) and T25 (2) to be cut-off, returning the output to 24 v. D.C. The circuit of inductance L25 and resistance R25 helps to achieve good regenerative action by causing R25 to represent the impedance during current changes and L25 to represent practically zero impedance under steady current conditions.

*Transmission enabling gate*

Figure 26:
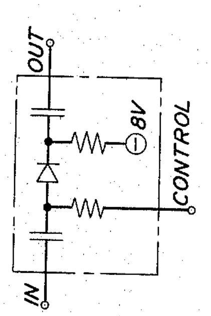
Figure 26A:
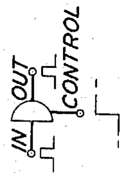

FIG. 26 shows circuitry of a transmission enabling gate for which the symbol is shown in FIG. 26A. With 24 v. D. C. on the control electrode this gate will not pass any pulses of 16 volt amplitude or less; and, with 8 v. D.C. on the control electrode the gate will not pass negative going pulses but will pass positive going pulses.

*Transmission inhibiting gate*

Figure 27:
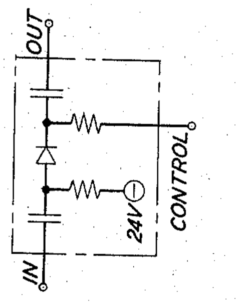
Figure 27A:
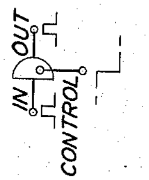

FIG. 27 shows circuitry of a transmission inhibiting or disabling gate for which the symbol is shown in FIG. 27A. With 8 v. D.C. on the control electrode the gate will not pass any input pulses of 16 volt amplitude or less; and, with the control electrode set at 24 v. D.C., this gate will not pass negative going pulses but will pass positive going pulse inputs.

*Ring counter*

Figure 28:
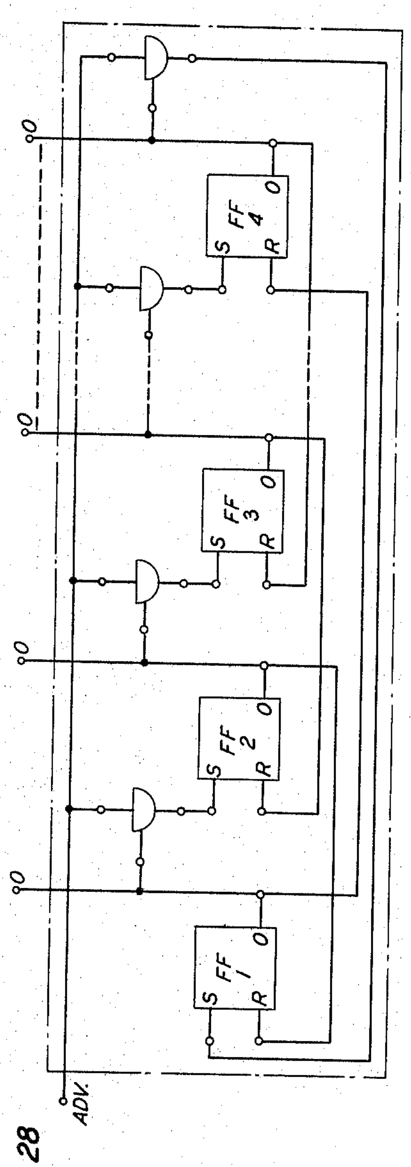
Figure 28A:
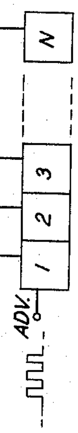

FIG. 28 shows the manner in which flip-flops and transmission enabling gates are arranged to form a ring counter for which the symbol is shown in FIG. 28A. When any flip-flop is in a set condition its output terminal is at 8 v. D.C., which is thereby applied to the control electrode of a transmission enabling gate so that the next positive going pulse on the advance or input lead (ADV) will set the next succeeding flip-flop, which in turn causes its output to change from 24 v. D.C. to 8 v. D.C. The latter change is applied to the reset terminal of the immediately preceding flip-flop as a positive going pulse, thereby to cause the latter flip-flop to be reset. This process continues in reentrant fashion so that for each successive advance pulse the ring counter has a different one of its output leads changed from 24 v. D.C. to 8 v. D.C., the reset being at 24 v. D.C.

*Line signal demodulator*

Figure 29A:
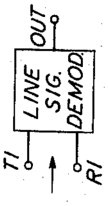
Figure 29:
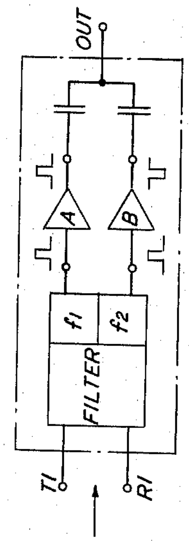

FIG. 29 illustrates circuitry comprising a frequency filter, amplifiers and condensers whereby a signal incoming over leads T1 and R1 of frequency *f*1 is converted to a positive going pulse which is regenerated in the A amplifier to a positive pulse output and whereby an incoming signal of frequency *f*2 is converted to a positive going pulse which is regenerated in the B amplifier to a negative pulse output. FIG. 29A shows the symbol for the circuitry of FIG. 29 whereby different spurts of frequency or frequency shift variations at the input are converted to positive going and negative goint output, for use in the pulse controlled system of the exemplary embodiment.

*Line signal modulator*

FIG. 30 shows circuitry comprising a variable frequency signal generator and amplifiers whereby a positive pulse input causes generation of a spurt of frequency $f1$ or a frequency shift to frequency $f1$ and whereby a negative pulse input causes generation of a spurt of frequency $f2$ or a frequency shift to frequency $f2$. FIG. 30A shows the symbol for the circuity of FIG. 30 whereby positive and negative pulses produced within the control circuits of the exemplary embodiment are transmitted over conductors T2 and R2 as spurts of different frequencies or as frequency shift variations.

C. SYSTEM COMPONENTS

The following description pertains, for the most part, to discussion of the major system components as depicted in the block diagram of FIG. 1.

*Scan control*

The scan control of FIG. 10 provides the basic common control timing for the system. With reference to FIGS. 31 and 32, the scan control provides a repetitive overall time period of 500 μs. divided into three parts as follows: output O1 of 450 μs. followed by output O2 of 50 μs., of which the last 25 μs. is defined by output O3. At the start of period O1, output O1 changes from 24 v. D.C. to 8 v. D.C. and outputs O2 and O3 change from 8 v. D.C. to 24 v. D.C. At the end of time O1, output O1 changes from 8 v. D.C. to 24 v. D.C. and output O2 changes from 24 v. D.C. to 8 v. D.C. At the beginning of period O3, output O3 changes from 24 v. D.C. to 8 v. D.C.

The time period of 450 μs. defined by output O1 is divided by the ring counter SCRC into 90 separate and successive 5 μs. time-slots, each of which, via the leads SCN–1 through SCN–90, controls a separate incoming trunk 1 through 90. As will be discussed later, a particular incoming trunk can process received or transmitted data only during its assigned 5 μs. time slot. This particular time slot recurs once every 500 μs., or at a recurrence rate or frequency of 2000 times per second. Thus, no incoming trunk may process data at a rate faster than 2000 bits per second. During the O1 period the scan control gate SCG is enabled whereby the scan oscillator SCN OSC, being synchronized at the start of period O1, drives the scan ring counter SCRC at a 200 kc. rate. Ring counter SCRC provides a 5 μs. positive going output to each trunk scan gate SCNG–1 through SCNG–90 in succession. These scan gates SCNG–1 through SCNG–90 provide 5 μs. positive pulses only during the O1 period. During the O1 period the clock multivibrator output O2, as will be explained, prevents the incoming trunks from affecting the crosspoint network of FIG. 11 and prevents the read-out control circuit of FIG. 12 from initiating any outgoing trunk selection operations.

At the end of the O1 period, which is the beginning of the O2 period, the ring counter SCRC is stopped and the trunk scan gates SCNG–1 through SCNG–90 are prevented from controlling the incoming trunks. During the first 25 μs. of the O2 period, the read-out control of FIG. 12 is permitted to process incoming trunk service requests and to initiate outgoing trunk selection and each incoming trunk is permitted to exercise control over the network of FIG. 11 if that particular incoming trunk is selected to be served by the read-out control of FIG. 12.

Figure 11:
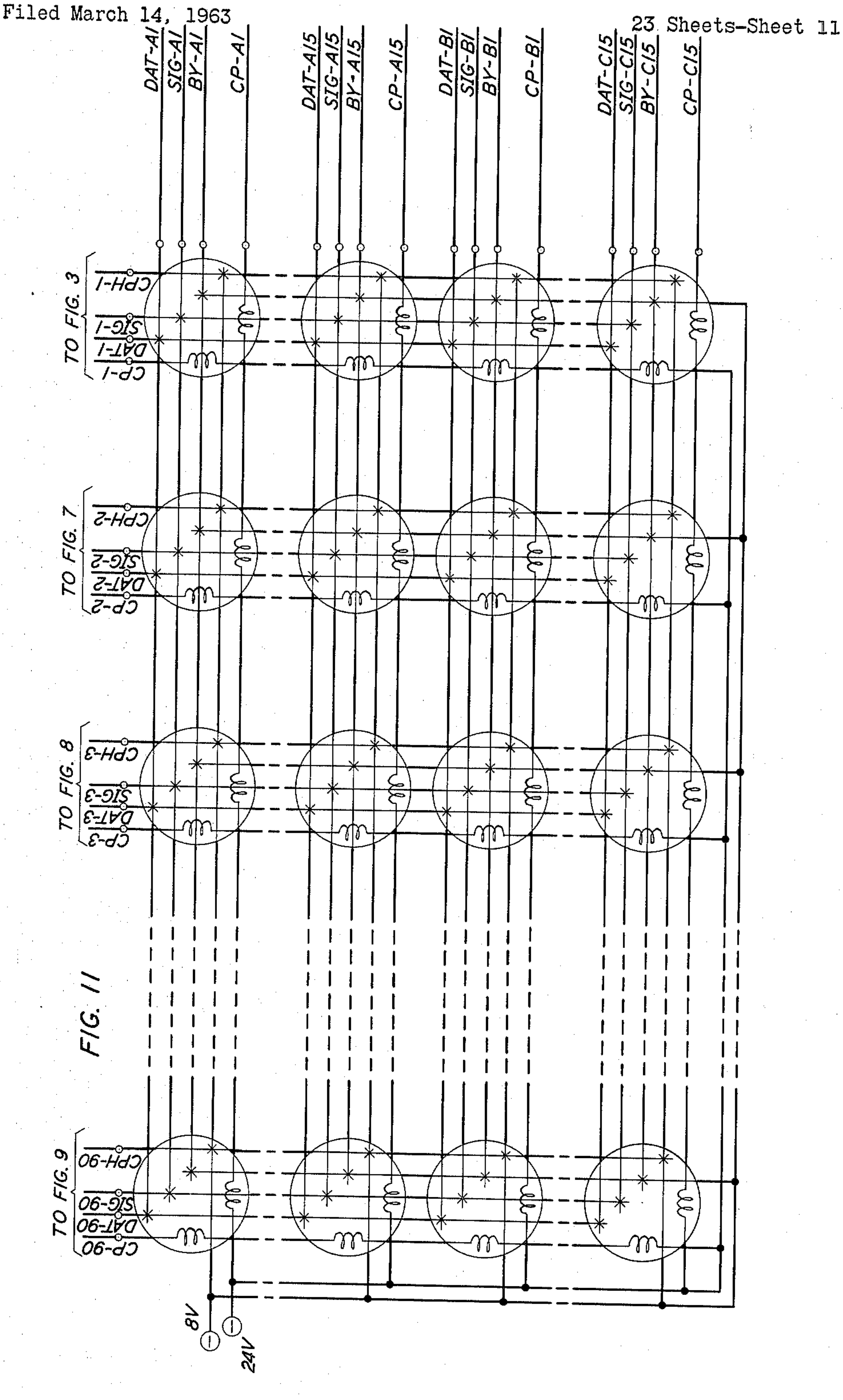
Figure 12:
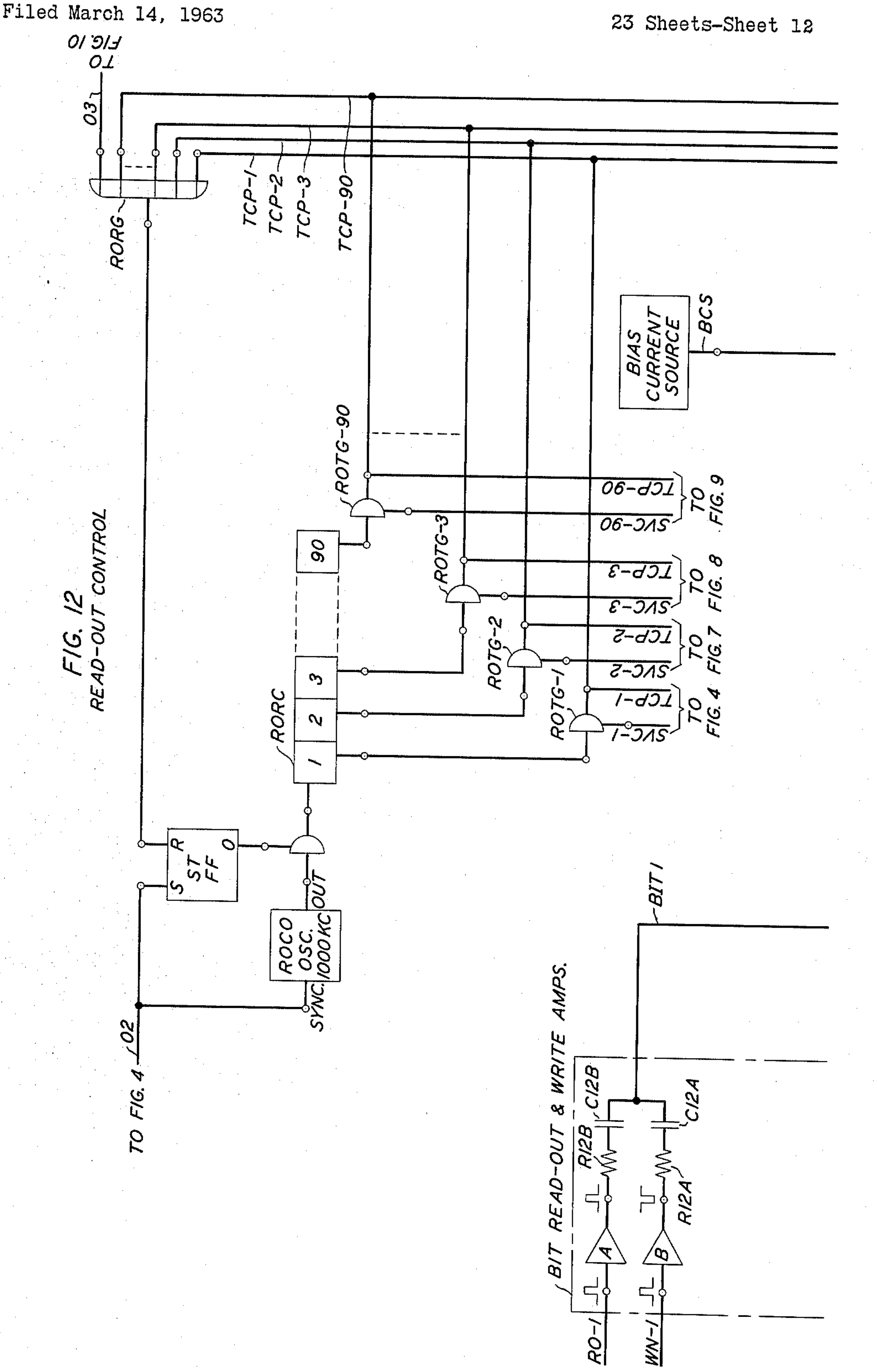

If the read-out control of FIG. 12 selects an incoming trunk to be served before the end of the first 25 μs. of the O2 period, the read-out control is reset and the rest of the O2 period is reserved for selection of an outgoing trunk and for operation of the network of FIG. 11 to interconnect the two trunks.

If no incoming trunk service request is recognized by the read-out control of FIG. 12 before the end of the first 25 μs. of the O2 period, the beginning of period O3 will force a reset of the read-out control in order to at all times reserve a minimum time of 25 μs. for outgoing trunk selection and network operation.

*Incoming trunk*

FIGS. 3 through 9 depict 90 incoming trunks, of which trunk 1 is disclosed in detail in FIGS. 3 through 6 and is assigned the 5 μs. time-slot 1.

When trunk 1 is disconnected (that is, not connected) from any outgoing trunk, it is arranged to accept through its write-in gates (FIG. 3) TWNG1 and TWNG2 successive binary bit pulses over lead DAT–1 from the line signal demodulator. Binary ones are represented by positive pulses and binary zeros are represented by negative pulses. These pulses are converted to a succession of positive pulses on lead BC–1 for controlling the binary bit counter of FIG. 5 which, in turn, controls the read-out gates ROG1 through ROG7 of FIGS. 5 and 6 according to the instant bit positions. The write flip-flop WR FF of FIG. 3 distinguishes between binary ones and binary zeros and permits a twistor (FIG. 13) word solenoid write control pulse to be applied to lead TWN–1 corresponding to bit positions of binary ones. At the same time, the steering write gates STWG1 through STWG7 of FIGS. 5 and 6 steer successive bits to corresponding bit positions of the twistor of FIG. 13. In this manner the seven binary bits of an address code are temporarily stored in the twistor.

Figure 3:
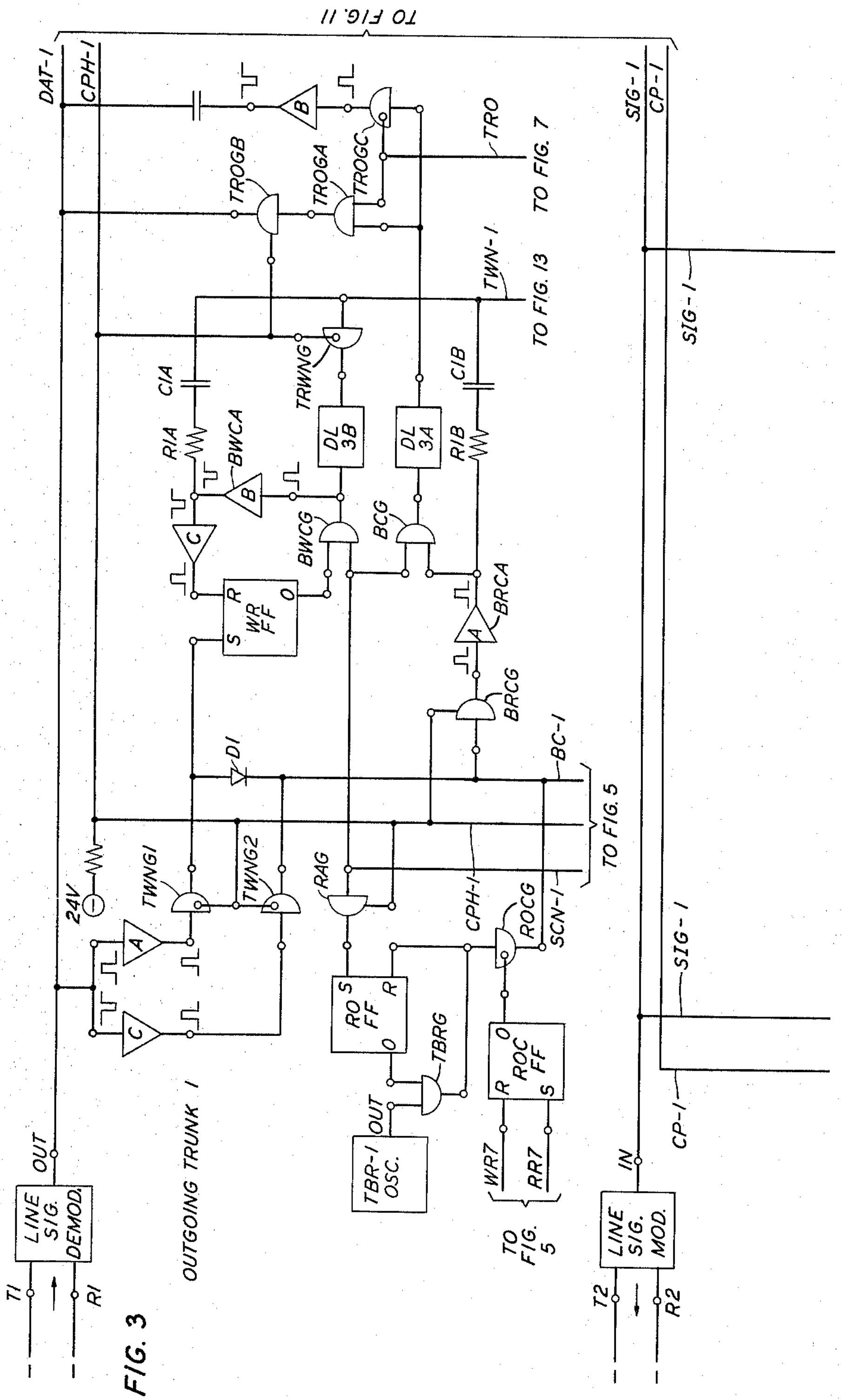
Figure 4:
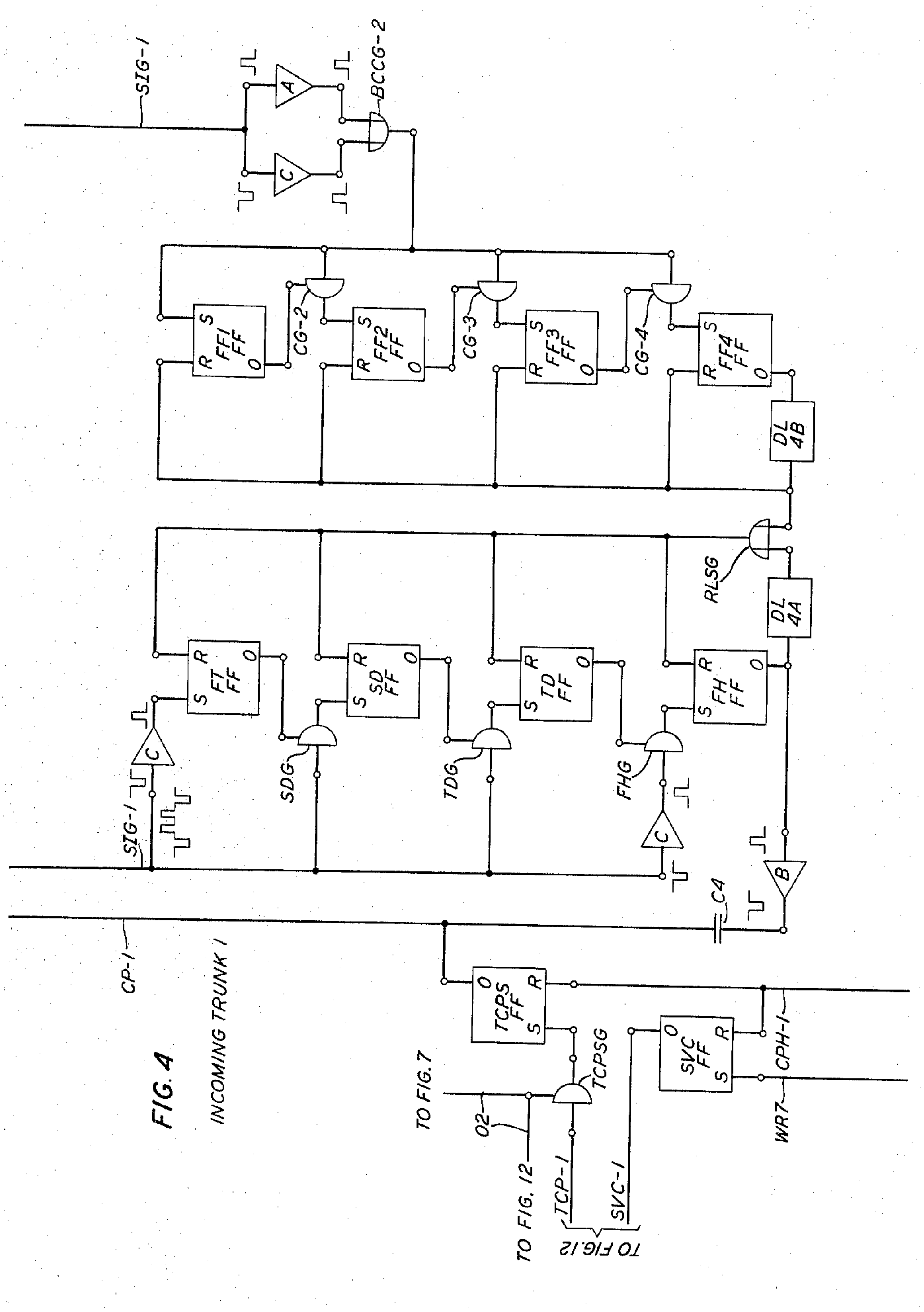
Figure 5:
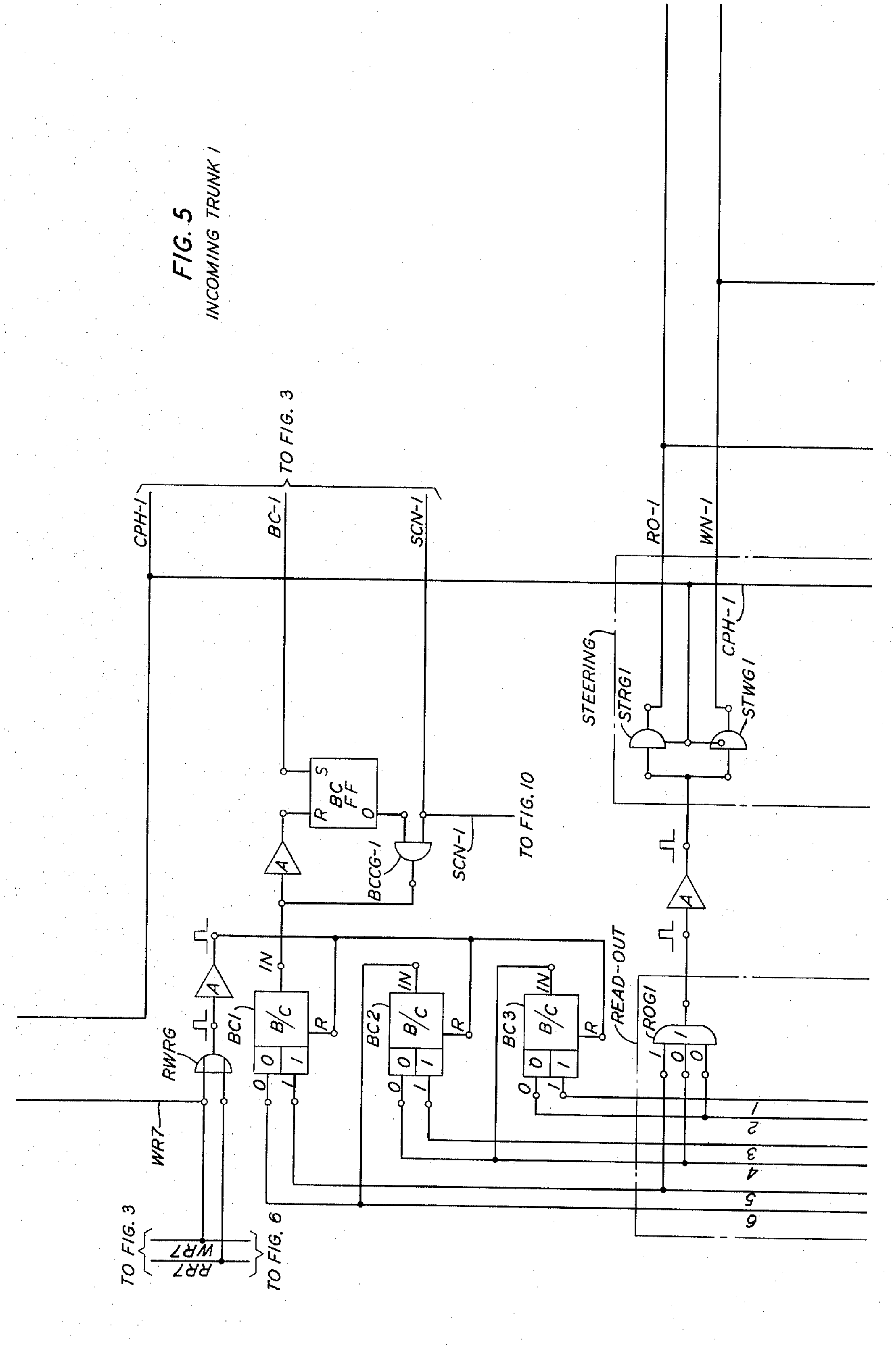
Figure 13:
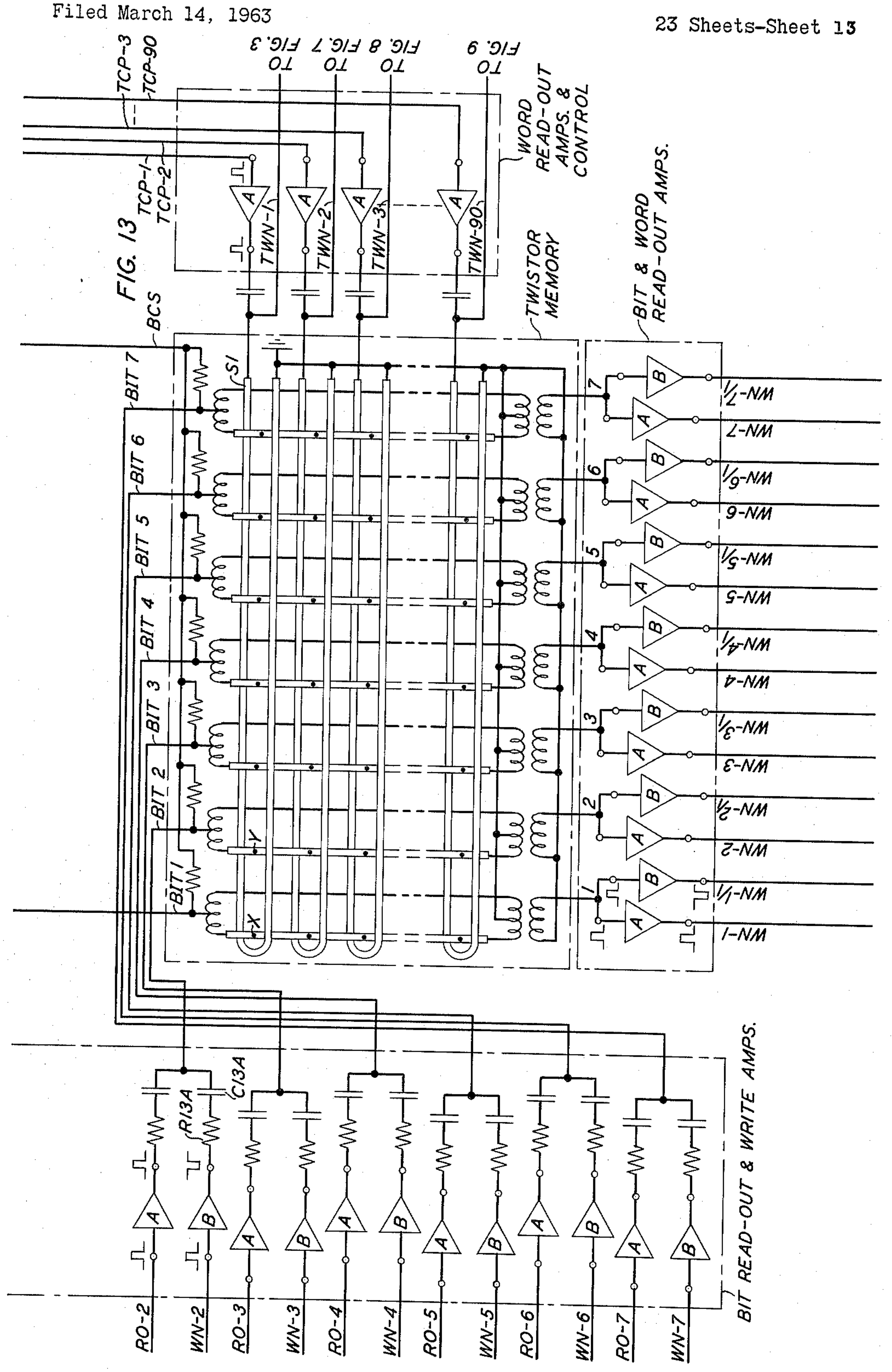

At the time the seventh, or last incoming bit is written into the twistor of FIG. 13, the binary bit counter of FIG. 5 is reset in preparation for counting outpulsed data bits, the read-out control flip-flop ROC FF of FIG. 3 is reset to allow outpulsing of the stored data when an outgoing trunk connection will have been effected, and the service flip-flop SVC FF of FIG. 4 is set to indicate to the read-out control of FIG. 12 that incoming trunk 1 is ready to be serviced.

When a connection has been established over the network of FIG. 11 with an outgoing trunk, the circuits of incoming trunk 1 are arranged to cause the stored address code to be read out bit-by-bit from the twistor of FIG. 13 and to be applied over lead DAT–1 in FIG. 3 to the connected outgoing trunk. This operation is controlled at the rate of the trunk bit rate oscillator TBR–1 OSC of FIG. 3. The binary counter of FIG. 5 establishes bit positions of transmitted pulses by controlling the steering read gates STRG1 through STRG7 of FIGS. 5 and 6.

When address code transmission is completed, the incoming trunk 1 is set into a condition whereunder it will respond only to a proper release signal sent to it over lead SIG–1 by the connected outgoing trunk. The left side of FIG. 4 shows a four-bit code detector which will respond only to the code 0110 (negative-positive-positive-negative) received over lead SIG–1. Proper response of the release detector will cause the network connection to be released and the incoming trunk to be reset into a receiving condition. The circuit on the right of FIG. 4 counts four-bits of any nature and recycles the release detector to prevent erroneous release detector response to codes other than the proper (0110) release code.

The lead SIG–1 passes all signals rearward through the line signal modulator as will be explained.

All receiving functions of trunk 1 are performed only during its repetitive 5 μs. time slot (2000 slots per second recurrence rate) but necessarily at whatever rate at which the incoming bits are detected. The incoming bit rate can vary randomly from incoming line to incoming line so long as it does not exceed 2000 bits per second.

All transmitting functions of trunk 1 are performed likewise only during its recurrent 5 μs. time slot but at the bit rate fixed by its local bit rate oscillator (TBR–1 OSC of FIG. 3 for trunk 1). This local bit rate is completely independent of incoming bit rate and can vary randomly from line to line so long as it does not exceed 2000 bits per second.

*Outgoing trunk*

Figure 15:
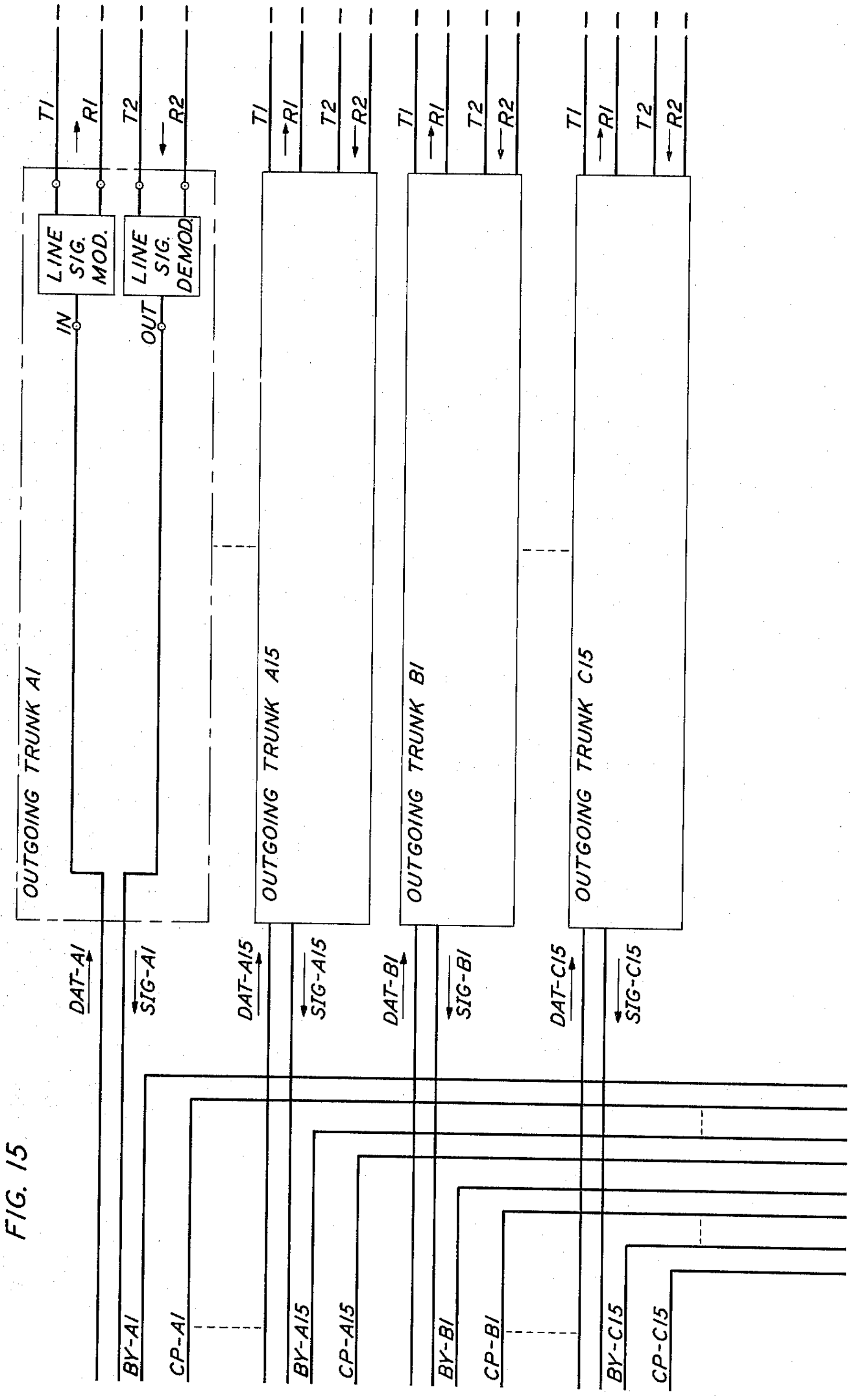

FIG. 15 illustrates as many as 45 outgoing trunks A1–

A15, B1–B15, and C1–C15, of which only trunks A1, A15, B1, and C15 are shown with the basic internal circuitry of trunk A1 also being shown. These outgoing trunks of FIG. 15 are connectable in known fashion to the incoming trunks of FIGS. 3 through 9 by means of the crosspoint network of FIG. 11. Each outgoing trunk, such as trunk A1, includes leads DAT–A1 and SIG–A1 which connect over the crosspoint network to the corresponding leads of an incoming trunk, such as leads DAT–1 and SIG–1 of incoming trunk 1. Two other leads, BY–A1 and CP–A1, extend into the outgoing trunk selector of FIGS. 16 and 17, the former to indicate the trunk busy-idle condition and the latter for operating the crosspoint network. Also, each outgoing trunk includes, such as are shown for trunk A1, a line signal modulator and a line signal demodulator for purposes similar to those of incoming trunk 1 (see FIG. 3).

*Switching network*

FIG. 11 illustrates in symbolic circuitry a well known crosspoint configuration whereby any circuit terminating in a vertical column may be connected to any circuit terminating in a horizontal row.

The crosspoint structure has been described briefly hereinbefore. Incoming trunk 1 has four leads CP–1, CPH–1, DAT–1, and SIG–1 terminating in the right-hand vertical column of FIG. 11; whereas, outgoing trunk A1 has four leads CP–A1, BY–A1, DAT–A1 and SIG–A1 terminating in the top horizontal row of FIG. 11. The intersections, marked with *x*'s at the crosspoints, represent contacts which are normally open: concurrent energization in particular current polarity of a vertical column of coils and a horizontal row of coils will cause the intersecting crosspoint to close its contacts: these contacts are arranged to be held closed magnetically when the concurrent coil energization is removed; and, reverse current energization of one coil will cause the crosspoint to release.

Whenever an incoming trunk, such as trunk 1 of FIGS. 3 through 6, is disconnected, its lead CPH–1 is adjusted to be at 24 v. D.C.: this sets controls in the trunk for processing received data.

Whenever incoming trunk 1 is connected, its lead CPH–1 is set at 8 v. D.C. over a closed crosspoint contact: this adjusts the trunk controls for processing transmitted data.

Whenever an outgoing trunk, such as trunk A1 of FIG. 15, is disconnected, its lead BY–A1 is set at 24 v. D.C. representing to the outgoing trunk selector of FIGS. 16 and 17 that the trunk is idle; whereas, when trunk A1 is connected, its lead BY–A1 is set at 8 v. D.C. over the closed crosspoint, thereby providing a busy indication to the outgoing trunk selector of FIGS. 16 and 17.

The vertical and horizontal coils of the network have one coil terminal at 24 v. D.C.: the other coil terminals extend respectively over leads, such as CP–1 and CP–A1, to the corresponding incoming trunk and to the corresponding outgoing trunk circuitry of the outgoing trunk selector. The lead CP–1 in incoming trunk 1 is normally at 24 v. D.C. (output of TCPS FF of FIG. 4) so that no current normally flows in the vertical coils corresponding to this trunk: lead CP–A1 for outgoing trunk A1 is normally at 24 v. D.C. (the A amplifier output in FIG. 16). When the trunk crosspoint select flip-flop TCPS FF of FIG. 4 is set, its output causes lead CP–1 to change to 8 v. D.C. producing a "positive" current in the vertical coils of FIG. 11 for incoming trunk 1. Whenever the outgoing trunk selector of FIGS. 16 and 17 selects outgoing trunk A1, the lead CP–A1 is changed from 24 v. D.C. to 8 v. D.C. for a time interval determined by the regenerative action of its A amplifier, thus causing a pulse of "positive" current in the horizontal coils of FIG. 11 for that outgoing trunk. The crosspoint identified by these concurrent positive currents will respond thereto to close the corresponding crosspoint contacts: the crosspoint will not operate on any other combination of coil current conditions. When the concurrent current energizations cease, the crosspoint is held operated magnetically. Eventually, incident to crosspoint closure, both coils revert to 24 v. D.C. on both terminals, reducing coil currents to zero.

When, at some subsequent time, the incoming trunk 1 detects a legitimate release code, a negative going pulse of about 16 volts amplitude will be applied (see FIG. 4) from the release detector of FIG. 4 to lead CP–1, thus causing a "negative" pulse of current to flow in the corresponding vertical coils of FIG. 11. This negative, or reverse current pulse causes the closed crosspoint to release, reverting both connected trunks to normal disconnected conditions.

*Twistor storage*

FIG. 13 shows the essentials of a well known type of twistor storage device with associated bit and word control amplifiers. The basic twistor memory illustrated in FIG. 13 is intended to represent the type disclosed in D. C. Weller Patent 3,000,004 of September 12, 1961. Other types of twistors could be employed, and, for that matter, as will be obvious to those skilled in the art, other types of memory devices or circuits may be used in lieu of the twistor.

The twistor, as used herein, is for temporary storage of address code bits pending transmission thereof over a completed connection. Therefore, destructive readout is employed in order to clear the memory as soon as possible. In the cleared condition all pertinent bit storage portions are placed in a condition to represent a stored zero bit.

In order to write a one bit into the twister, two concurrent conditions must be met: a half-power negative current pulse must be applied to the horizontal word solenoid corresponding to the incoming trunk, such as lead TWN–1 in FIG. 13 from incoming trunk 1; and, a half-power negative current pulse must be applied to the proper bit wire, such as lead BIT1 in FIG. 13 for bit position 1.

In order to read a bit from the twistor, half-power positive current pulses must be applied concurrently to the trunk word solenoid (lead TWN–1) and to the particular bit wire (BIT1).

In order to read-out in parallel all bits of a whole word, or address code, a full-power positive current pulse is applied to the word solenoid (lead TWN–1), with no pulse or pulses being applied to the bit wires. This will cause all bits of a whole word (or address code) to be read-out in parallel.

If a one-bit has been stored, it will be read-out as a positive going pulse by the bit and word read-out amplifiers at the bottom of FIG. 13; whereas, if no bit (that is, a zero-bit) has been stored, there will be no output from it upon read-out.

*Read-out control*

The read-out control circuit of FIG. 12 is, in substance, the circuit which is enabled at the start of the O2 time period (at the end of the 450 μs. incoming trunk scan cycle consisting of time period O1) to start scanning the incoming trunk service request flip-flops, such as SVC FF of FIG. 4, to try to find one requiring outgoing trunk selection. The read-out control oscillator ROCO OSC drives the ring counter RORC at a megacycle rate in order to scan a maximum of 25 incoming trunks within the first 25 μs. of the O2 period (see timing diagrams of FIGS. 31, 32 and 33). If a service request is detected within the 25 μs., the read-out control stops its trunk scanning and initiates action within the particular incoming trunk and within the twistor of FIG. 13 whereby an outgoing trunk is selected and a network connection effected.

As has been mentioned hereinbefore, if no service request is detected within the 25 μs., the beginning of the O3 time period stops the action of the read-out control. This action is taken to insure a maximum of 15 μs. for trunk selection and a minimum of 10 μs. for crosspoint control.

*Address translator*

Figure 14:
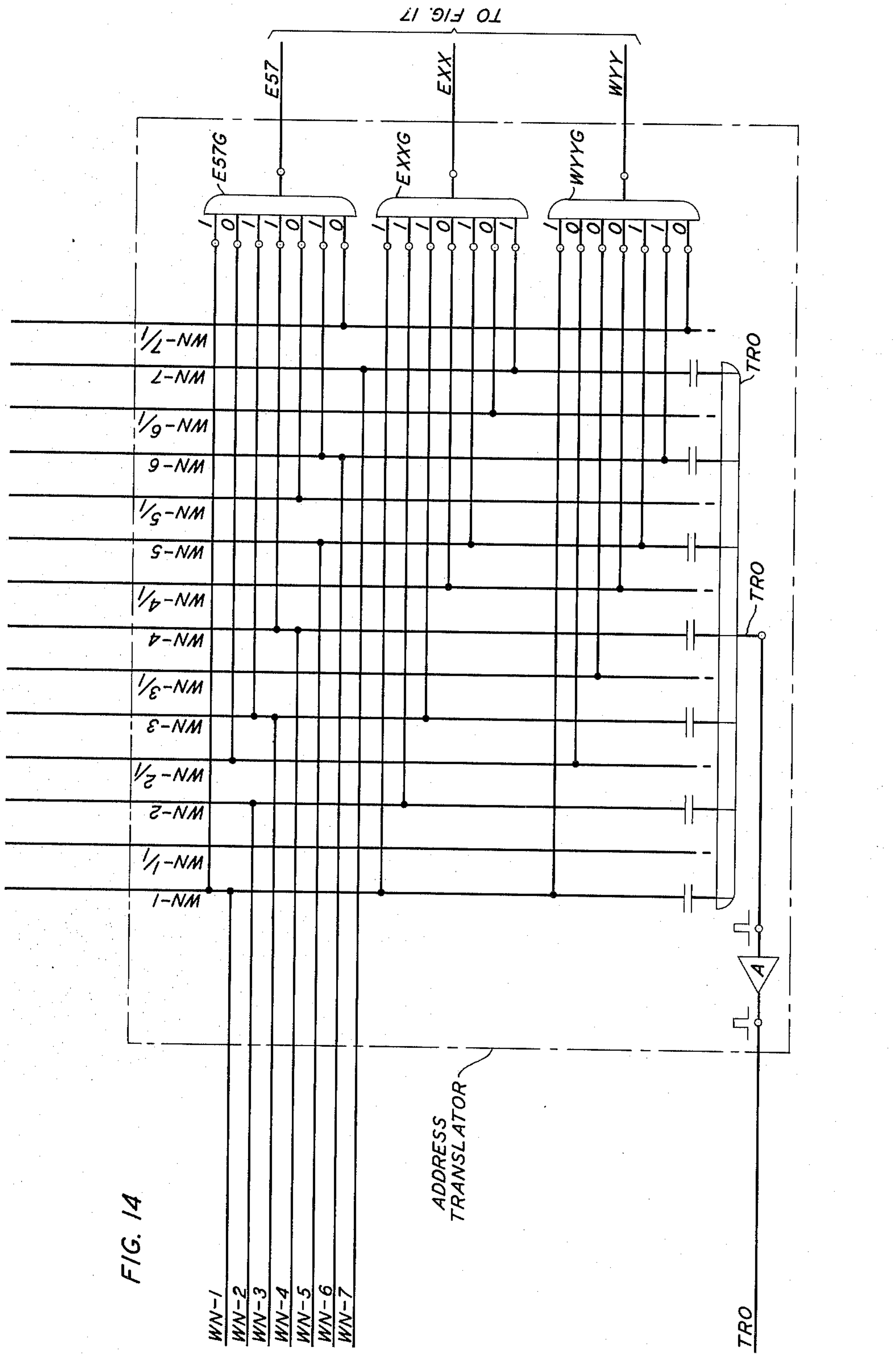

The address translator of FIG. 14 consists of a control OR gate TRO and of a number of AND gates for detecting particular address codes read-out in parallel from the twister of FIG. 13. For example, the E57G gate will provide an output pulse on lead E57 only if the code 1011010 is read-out in parallel from the twistor; whereas, the gates EXXG and WYYG respond only to the particular parallel read-out codes for which they are wired. The TRO gate is used to supply serially read-out binary ones to enable such bits to be transmitted: binary zeros are generated within the incoming trunks in the absence of pulses from the TRO gate.

Figure 16:
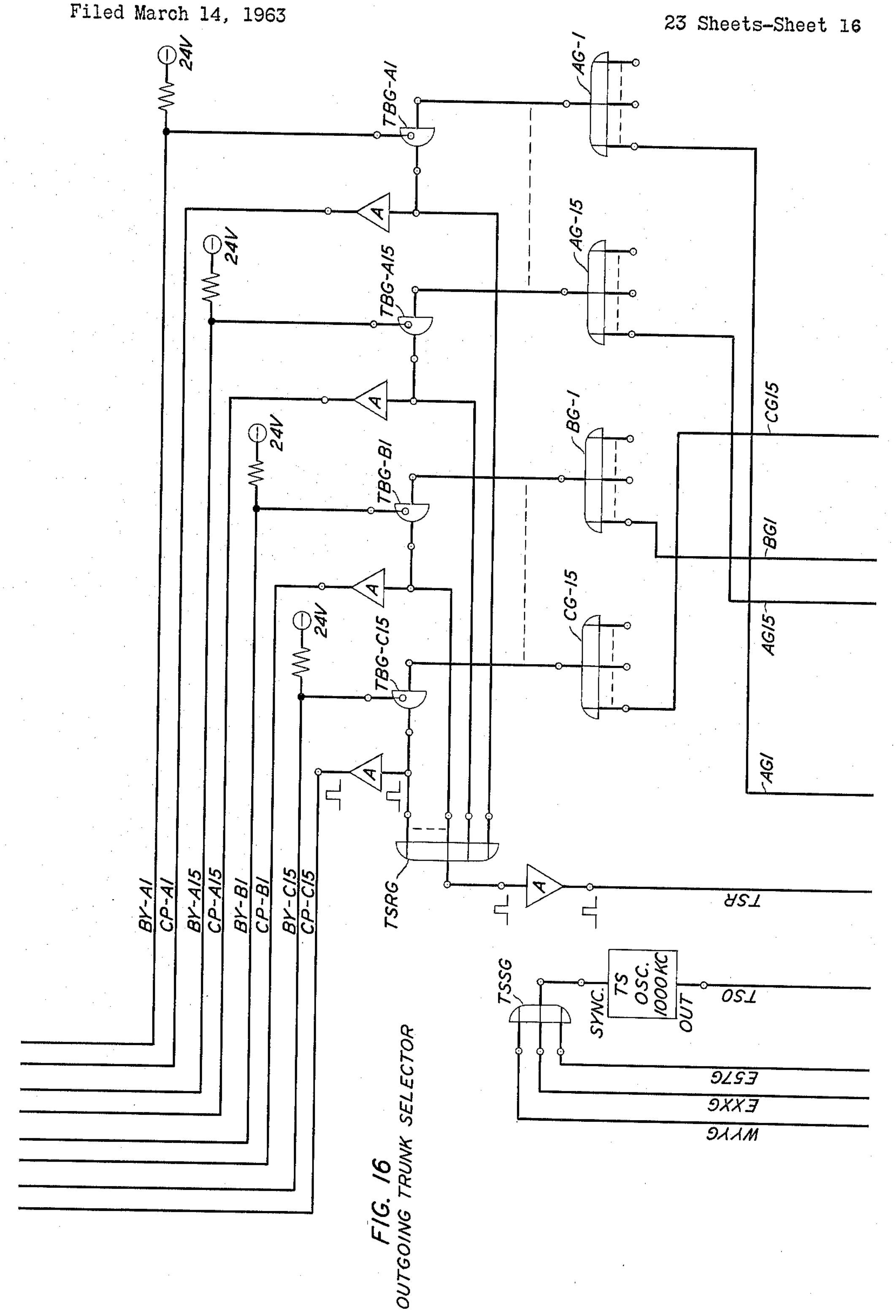
Figure 17:
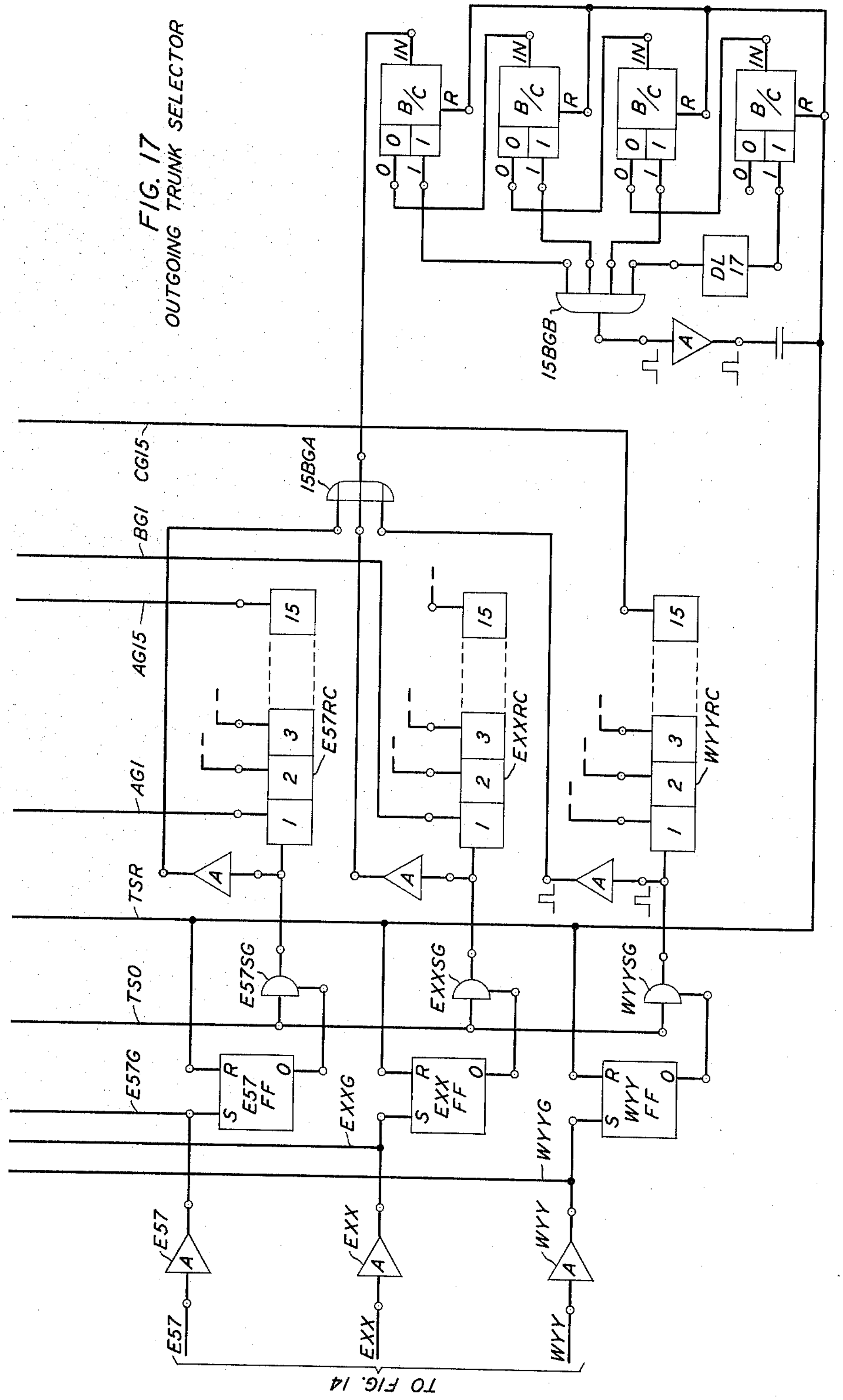

The output pulse from one of the AND gates, such as E57G, is used to initiate outgoing trunk selection in the circuit of FIGS. 16 and 17.

*Outgoing trunk selector*

FIGS. 16 and 17 show the outgoing trunk selection circuitry. This selector is brought into operation whenever an output pulse is received from the address translator of FIG. 14. Normally all of the flip-flops E57, EXX and WYY of FIG. 17 are reset, thereby blocking the trunk select oscillator TS OSC of FIG. 16 from advancing any of the ring counters E57RC, EXXRC and WYYRC of FIG. 17.

Whenever an address code pulse is received from the address translator of FIG. 14, such as a pulse on lead E57, indicating that a trunk is to be selected for a particular route, such as route E57 (Eastward Route No. 57), the corresponding flip-flop, such as E57 FF, will be set. This opens gate E57SG and allows the megacycle oscillator TS OSC to drive the corresponding ring counter E57RC at the rate of one step per microsecond. Since the first 15 μs. of the O3 time period (see FIG. 33) is the maximum time allowed for outgoing trunk scanning, it is obvious that the maximum trunk group will preferably have 15 or less trunks. Thus, each ring counter, such as E57RC, has 15 stages for scanning 15 trunks, such as trunks A1 through A15 of FIG. 15.

Each pulse from the oscillator of FIG. 16, in addition to stepping ring counter E57RC, provides a pulse input through gate 15BGA to the four-stage binary counter at the right in FIG. 17. This counter is arranged to count 15 such pulses and to provide an output through gate 15BGB one microsecond (see delay line DL17) after the fifteenth input to the counter. The output from gate 15BGB is used to reset the entire selector in case no idle trunk is found within 15 μs.

If an idle trunk is found during the 15 μs. interval, the output from the corresponding ring counter stage, such as stage 1 of ring counter E57RC, is applied through gate AG–1 of FIG. 16, through the gate TBG–A1 (permitting pulse transmission when trunk A1 is idle), and to the A amplifier whose output is connected to the lead CP–A1 for trunk A1. The output from gate TBG–A1 is also used to reset the entire outgoing trunk selector circuitry.

The last 10 μs. of the O3 time period (see FIG. 33) is reserved as the minimum allowable time for crosspoint operation. The A amplifier (FIG. 16), whose output is connected to lead CP–A1, regenerates a suitable pulse over lead CP–A1 to energize in the "positive" direction the horizontal coils (FIG. 11) corresponding to outgoing trunk A1. Since the vertical coils (FIG. 11) are at that time suitably energized (output of TCPS FF of FIG. 4), the upper right-hand crosspoint will close, and it will remain closed after the concurrent coil energization ceases, which in the present embodiment occurs when the pulse on lead CP–A1 ceases.

The closing of the crosspoint completes the incoming trunk 1-outgoing trunk A1 connection, setting the incoming trunk 1 into a code transmitting condition and making the outgoing trunk appear busy to the outgoing trunk selector.

D. DETAILED DESCRIPTION

This general section of the specification contains a detailed description of the sequential operation of the embodiment shown in FIGS. 3 through 17 arranged as shown in FIG. 2. The organization of the section is as follows.

Assumed Conditions
Storing Received Address Code: First Digit . . . Intermediate Digits . . . Last Digit
Outgoing Trunk Selection: Read-out Control . . . Destructive Parallel Read-out and Parallel Restorage . . . Address Translation . . . Outgoing Trunk Selection
Switching Network Operation: Connection of Trunks . . . Setting Incoming Trunk for Code Transmission . . . Marking Connected Outgoing Trunk as Busy
Processing Transmitted Address Code: First Digit . . . Intermediate Digits . . . Last Digit . . . Setting Incoming Trunk for Message Transmission
Message Transmission Start Signal
Transmission of Message
Release of Connection

*Assumed conditions*

Incoming trunk 1 is assumed to have finished its previous job, to be disconnected from any outgoing trunk, and to be set in condition to process a received address code.

In this condition the following component status prevails in the incoming trunk 1 of FIGS. 3 through 6: the read-out control flip-flop ROC FF of FIG. 3 is in a set condition thereby causing gate ROCG of FIG. 3 to inhibit control over the circuit by the local bit rate oscillator TBR–1 OSC of FIG. 3; the binary counters of FIGS. 4 and 5 are in a reset condition; the binary counter flip-flop BC FF of FIG. 5 is reset; the service flip-flop SVC FF and the trunk crosspoint select flip-flop TCPS FF of FIG. 4 are reset; and, the write and read-out flip-flops WR FF and RO FF of FIG. 3 are reset.

It will be assumed that seven-bit binary address codes are employed and that incoming to trunk 1 will be the code E57 (Eastward Route No. 57) represented by the binary representation 1011010. Binary digits will arrive over leads T1 and R1 in FIG. 3 as spurts of frequency *f*1 for binary ones and of frequency *f*2 for binary zeros. The line signal demodulator will convert these digits to respective positive and negative going pulses on lead DAT–1. These digits may arrive at any desired bit rate not greater than 2000 bits per second.

It is assumed that the scan control of FIG. 10 is just starting the O1 time period, at which point the scan ring counter will be stepping from time-slot 90 to time-slot 1 corresponding to trunk 1.

It is assumed that the read-out control of FIG. 12 has been stopped by the resetting of the ST FF with ring counter RORC on position 90, ready to step to position 1 upon being restarted.

It is also assumed that the outgoing trunk selector of FIGS. 16 and 17 has been reset with ring counter E57RC stopped on its position 15, ready to step to position 1 as soon as it may receive an input pulse.

*Storing received address code*

Before incoming trunk 1 can cause those control functions to take place, resulting in selecting a suitable outgoing trunk, it is necessary for trunk 1 to detect, evaluate and store the successively received serial binary digits 1011010 representing the address code E57. As each binary bit is received trunk 1 makes note of its bit position and bit value, causes the bits to be stored in the twistor, and ascertains when a full code has been received. The successive bits 1011010, it will be recalled, are represented at the output of the line signal demodulator (FIG. 3) as successive pulses of positive polarity for binary ones and negative polarity for binary zeros.

The first pulse, being positive, is passed through the A amplifier and gate TWNG1 to set WR FF and to apply a positive pulse through the low impedance direction of diode D1 to lead BC–1. The WR FF, in being set, energizes one of the two inputs to gate BWCG so as to permit a positive pulse input to the B amplifier BWCA when trunk 1 is scanned. The positive pulse on lead BC–1 extends thereover into FIG. 5 where it sets the BC FF. The output of BC FF energizes one input to gate BCCG–1 so as to cause the binary counter in FIG. 5 to count this first digit when trunk 1 is scanned.

It has been assumed that the scan control of FIG. 10 will be in its O1 period where the ring counter SCRC is just stepping from stage 90 to stage 1 to define the 5 μs. time slot for trunk 1. When this action takes place the output of stage 1 of SCRC, in coincidence with the basic O1 output of the clock multivibrator, will cause the scan gate SCNG–1 to produce a 5 μs. positive pulse output onto scan lead SCN–1, which extends into FIG. 5, where it controls gate BCCG–1, and thence into FIG. 3, where it controls gate BWCG.

The digit value of binary one is detected by gate BWCG in FIG. 3 and is passed as a positive pulse to the input of the B amplifier BWCA, which produces a negative pulse output returned through the C amplifier as a positive reset pulse to WR FF, thereby resetting WR FF preparatory to responding, if at all, to the second digit. The negative pulse output from amplifier BWCA is passed through R1A and C1A to the twistor write-in lead TWN–1. The negative pulse on lead TWN–1 is adjusted in amplitude by R1A to a value representing a half power pulse delivered into FIG. 13 to the word solenoid S1 of the twistor, where the resulting negative half power current pulse in solenoid S1 will permit bit write-in if a concurrent negative half power current pulse is applied to any of the bit wires BIT1 through BIT7.

In the meantime, the positive pulse output from gate BCCG–1, of FIG. 5 sets the first binary counter stage BC1 into the condition where its output 0 is changed from 8 v. D.C. to 24 v. D.C. and its output 1 is changed from 24 v. D.C. to 8 v. D.C. Since binary counter stages BC2 and BC3 are unaffected by this change of state of stage BC1, it will be apparent that read-out gate ROG1 of FIG. 5 will produce at its output a positive pulse at the time when counter stage BC1 changes. This pulse is passed through the A amplifier, through the write-in gate STWG1, over lead WN–1 into FIG. 12, through the B amplifier as a negative output, and through R12A and C12A, to the bit wire BIT1 extending into FIG. 13. The pulse applied to lead BIT1 is arranged to represent a negative half power pulse, which will cause a binary one to be written-in or stored in the twistor of FIG. 13 in bit position 1 (marked *x* on FIG. 13) for word solenoid S1 defining the twistor section reserved for trunk 1. The pulses applied to the bit wires BIT1 through BIT7 do not affect the read-out amplifiers in FIG. 13, as is known from the teachings of the aforementioned Weller patent.

Also, in the meantime, the output pulse from gate BCCG–1 in FIG. 5 is passed through the A amplifier to reset the BC FF preparatory to counting the next binary bit.

As a result of the foregoing action associated with detecting, evaluating and storing the first digit, the incoming trunk 1 has been returned to its normal receiving condition, the first digit one has been stored in the twistor of FIG. 13, and the incoming trunk binary counter of FIG. 5 retains, in its stage BC1, the information that trunk 1 has counted one digit.

In like manner, the scan control of FIG. 10 scans the remaining incoming trunks 2 through 90, whereupon trunk scanning ceases for 50 μs. within which connection completion operations, to be described later, take place. At the end of this 50 μs. interval, the scan control of FIG. 10 again enters the O1 time period to again scan all 90 incoming trunks, including trunk 1 in its 5 μs. time slot 1.

It will be recalled that the recurrence rate of a particular trunk scan time slot, such as time slot 1 for incoming trunk 1, is once each 500 μs. and that the incoming trunk bit rates cannot exceed this rate (2000 bits per second). Such incoming bit rates can be less than 2000 bits per second; thus, the next time trunk 1 is scanned there may or may not have been a received bit since the immediately preceding scan cycle. Until a second digit is received by trunk 1, however, the counter of FIG. 5 will not change its count, nor will the write flip-flop WR FF of FIG. 3 be affected. Thus, no storage control will be instituted. Sooner or later, this or a subsequent scan of trunk 1 will detect an additional digit count with its associated evaluation of a binary one or a binary zero.

The second digit of the assumed address code (1011010) is a binary zero, represented by a negative pulse, which, having been inverted in the C amplifier feeding gate TWNG2, is manifested as a positive pulse on lead BC–1, but which does not set the WR FF due to the blocking action of diode D1. Since the WR FF is not set by this pulse, the gate BWCG will not pass a positive pulse to the bit write B amplifier BWCA and no word solenoid control pulse will reach the twistor of FIG. 13 over lead TWN–1 from FIG. 3. Thus, no storage for bit No. 2 will take place, leaving the storage place (marked Y in FIG. 13) of bit No. 2 for word solenoid S1 in its normal condition, which, it is recalled, is a binary zero representation.

In the meantime, the positive pulse on lead BC–1 of FIG. 3 will set the BC FF of FIG. 5 to cause the first counter stage BC1 to revert to its zero condition (output 0 at 8 v. D.C. and output 1 at 24 v. D.C.). The flip-flop BC FF is reset as previously described. When counter stage BC1 reverts to its zero condition, its output 0 changes from 24 v. D.C. to 8 v. D.C.—a positive pulse—causing the second stage BC2 to change from its zero condition to its one condition. This change of stage BC2 will cause the output 0 to change from 8 v. D.C. to 24 v. D.C. and its output 1 to change from 24 v. D.C. to 8 v. D.C. At this time, as will be apparent from FIGS. 5 and 6, read-out gate ROG2 of FIG. 6 will pass a positive pulse and the other read-out gates ROG1 and ROG3 through ROG7 will not. The positive pulse from gate ROG2 passes through its A amplifier, through gate STWG2, over lead WN–2 into FIG. 13, through the B amplifier where it is inverted to a negative pulse output, and through R13A and C13A to bit wire BIT2. Since there is no concurrent control current in solenoid S1 there will be no storage.

As will be apparent from the foregoing discussion of the manner in which the first two digits are detected, evaluated and stored, by the same process the last five digits of the address code (1011010) are likewise processed. In each successive instance the binary counter of FIG. 5 will count successive received bits so as to allow successive ones of the read-out gates ROG3 through ROG7 of FIG. 6 to apply negative write pulses to the successive twistor bit wires BIT3 through BIT7 of FIG. 13. In this fashion, the seven successive bits (1011010) of the address code will be stored in the corresponding bit positions of the twistor for solenoid S1 reserved for trunk 1.

When the seventh, or last received bit is processed, additional controls are made effective to prepare trunk 1 for effecting selection of an outgoing trunk. As the positive pulse is delivered from steering gate STWG7 in FIG. 6, corresponding to storing the last binary digit zero in the twistor of FIG. 13, the same positive pulse is applied in FIG. 6 to lead WR7, which extends into FIGS. 5, 4 and 3. In FIG. 5, the positive pulse on lead WR7 is passed through reset gate RWRG and by the A amplifier to reset all of the stages BC1, BC2 and BC3 of the binary counter into their zero conditions to prepare the binary counter for later use in processing transmitted data. In FIG. 4, the pulse on lead WR7 sets the service flip-flop SVC FF. This causes the SVC FF output lead SVC–1 to change from 24 v. D.C. to 8 v. D.C., thereby, in FIG. 12, to enable the read-out trunk gate ROTG–1 as an indication to the read-out control of FIG. 12 that incoming trunk 1 desires service. In FIG. 3, the pulse on lead WR7 resets ROC FF: this causes the read-out control gate ROCG of FIG. 3 to be enabled preparatory to processing transmitted data.

*Outgoing trunk selection*

At this point in the discussion, incoming trunk 1 has detected, evaluated and stored the seven-bit address code 1011010; the read-out control of FIG. 12 has been informed that incoming trunk 1 desires service; and, trunk 1 has been partially prepared for processing transmitted data.

At the end of the O1 time period (450μs.), the scan control of FIG. 10 stops incoming trunk scanning and causes the lead O2 to change from 24 v. D.C. to 8 v. D.C. Lead O2 extends to each incoming trunk circuit of FIGS. 3 through 9 and to the read-out control of FIG. 12. In FIG. 12, the positive going change on lead O2 sets the start flip-flop ST FF to cause the ROCO OSC to synchronously apply pulses to the ring counter RORC. It was assumed that the first pulse would step RORC from stage 90 to stage 1, which action now takes place.

The RORC ring counter, in stepping from its position 90 to its position 1, applies a positive pulse to the input of the gate ROTG–1, which, in turn being enabled by the service request signal on lead SVC–1 from incoming trunk 1, passes the positive pulse to its output lead TCP–1. The positive control pulse on lead TCP–1 (1) resets the read-out control circuit of FIG. 12 (2) causes the incoming trunk 1 of FIGS. 3 through 6 to energize its corresponding vertical coils in the network of FIG. 11, and (3) controls destructive parallel read-out from the twistor of FIG. 13 of the stored address code and parallel restorage of the same.

In FIG. 12, the positive pulse on lead TCP–1 passes through reset gate RORG to reset the ST FF, thereby to stop the action of the ring counter RORC. Thus, no more service requests will be scanned until the next subsequent O2 time period defined by the scan control of FIG. 10. This leaves ring counter RORC on stage 1 so that when it is again activated incoming trunk 2 will be the first one scanned for a service request.

In the meantime, in FIG. 4 the positive pulse on lead TCP–1 passes through the enabled gate TCPSG to set the trunk crosspoint select flip-flop TCPS FF. The output of TCPS FF, in going from 24 v. D.C. to 8 v. D.C., causes a "positive" current to flow in those vertical coils in the network of FIG. 11 corresponding to incoming trunk 1. This circuit may be traced from 8 v. D.C. at the output of TCPS FF in FIG. 4, over lead CP–1 into FIG. 3, and thence into FIG. 11 and to 24 v. D.C. through all of the vertical coils in series at the right hand edge of FIG. 11. This current, as will be recalled, is insufficient, acting alone, to close any associated crosspoint; but, the current is sustained, waiting for a "positive" horizontal coil current corresponding to a selected outgoing trunk.

Also in the meantime, in FIG. 13, the positive pulse on lead TCP–1 is applied through its associated A amplifier to word solenoid S1, resulting in a full power positive solenoid current pulse. This full power positive solenoid current, as will be recalled, will cause destructive parallel read-out of all seven bits stored in the bit positions corresponding to solenoid S1. Wherever a one bit has been stored, such as bit position X, the read-out will manifest this fact by causing a positive pulse to be applied to the inputs of the A and B read-out amplifiers (bottom of FIG. 13) corresponding to the bit position; and, wherever a zero bit has been stored, such as bit position Y, no effective pulse output is produced at the inputs of the corresponding A and B read-out amplifiers. Thus, the A and B read-out amplifiers are used to detect the seven bit address code 1011010.

As a result of the parallel read-out operation, two significant actions take place: (1) the destructively read-out address code is caused to be restored in the twistor so that it will be available later for serial read-out and transmission to a connected outgoing trunk and (2) the parallelly read-out code is used to activate the address code translator of FIG. 14 whereby outgoing trunk selection is initiated.

The restorage of the destructively read-out code 1011010 is effected by using the outputs in FIG. 13 of the A type read-out amplifiers, which are represented on leads WN–1, WN–2, WN–3, WN–4, WN–5, WN–6 and WN–7 by positive pulses for binary ones and no pulses for binary zeros. These leads extend from FIG. 13, through FIGS. 14, 7, 6 and 5 and into FIGS. 12 and 13, where the B type write amplifiers convert the positive pulses to negative pulses and apply them as negative half power pulses to the corresponding bit wires of the twistor in FIG. 13. In the meantime, the positive word read-out pulse applied to solenoid S1 in FIG. 13 is returned over lead TWN–1 into FIG. 3, through the gate TRWNG, through delay line DL3B (to adjust for inherent read-out delay in the twistor), through the B amplifier BWCA where it is regenerated as a negative pulse, thence through R1A and C1A, and back over lead TWN–1 into FIG. 13 where it is applied as a negative half power pulse to solenoid S1. The delay is arranged so that the solenoid pulse is concurrent with the bit wire pulses, thus causing all seven bits 1011010 to be restored in the twistor of FIG. 13.

Returning to the previous parallel read-out of the code 1011010, the A and B read-out amplifiers at the bottom of FIG. 13 control the address translator of FIG. 14 to provide a positive pulse output from only that AND gate E57G, EXXG, WYYG, et cetera, whose inputs are arranged to be concurrently positively energized by A and B amplifier outputs corresponding to the code 1011010. It will be recalled that normally (when not responsive to pulse input) all A type amplifiers have their outputs (leads WN–1 through WN–7 of FIG. 13) at 24 v. D.C. and all B type amplifiers have their outputs (lead WN–1/1 through WN–7/1 of FIG. 13) at 8 v. D.C.; and, it will be recalled that the A and B amplifiers are responsive to only positive pulse inputs to change their outputs respectively from 24 v. D.C. to 8 v. D.C. and from 8 v. D.C. to 24 v. D.C. It will be observed in FIG. 14 that gate E57G is wired to the A and B amplifier outputs so as to have 8 v. D.C. applied to those inputs of gate E57G connected to B type amplifiers and that this represents those digits of the code 1011010 which are zeros, namely bit numbers two (lead WN–2/1), five (lead WN–5/1) and seven (lead WN–7/1): during the parallel read-out of code 1011010, these three leads WN–2/1, WN–5/1 and WN–7/1 will not be changed, thus remaining at 8 v. D.C. On the other hand, the other four inputs to gate E57G, namely leads WN–1, WN–3, WN–4 and WN–6, will change from 24 v. D.C. to 8 v. D.C. when the binary ones corresponding to those bit positions cause the corresponding A amplifiers of FIG. 13 to respond to those digits (ones) as they are read-out. Thus, the parallel read-out of the code 1011010 will cause the seven inputs to gate E57G concurrently to become positive whereby lead E57 at the output of gate E57G produces a positive pulse extending into FIG. 17. The other AND gates of FIG. 14, such as EXXG and WYYG, are wired for other address codes.

In FIG. 17, the positive pulse on lead E57 from the address translator of FIG. 14 initiates action whereby a suitable outgoing trunk is selected if an idle one is found. The positive pulse on lead E57 passes through the A amplifier E57 to lead E57G which extends to the set terminal of flip-flop E57 FF of FIG. 17 and which extends into FIG. 16 and through gate TSSG to the synchronizing terminal of oscillator TS OSC. The set E57 FF enables gate E57SG so that the oscillator TS OSC can drive ring counter E57RC at the rate of one stop per microsecond (see FIG. 33). It was assumed that E57RC was stopped on stage 15: thus, the first pulse from TS OSC over lead TSO will cause E57RC to step to its position 1 corresponding to outgoing trunk A1 of FIG. 15.

As ring counter E57RC of FIG. 17 steps from its position 15 to its position 1, a positive pulse output is applied to lead AG1 extending into FIG. 16, through gate AG–1, and to the input of inhibiting gate TBG–A1. It is assumed that outgoing trunk A1 of FIG. 15 is idle: its corresponding lead BY–A1 will be set at 24 v. D.C., which allows the pulse input to gate TBG–A1 to pass therethrough to the input of the A amplifier whose output is connected to lead CP–A1 in FIG. 16. This positive pules output from gate TSG–A1 is also applied, in FIG. 16, through gate TSRG and through the A amplifier to lead TSR extending into FIG. 17 to reset flip-flop E57 FF, thereby stopping the trunk scanning action of ring counter E57RC, leaving it on its stage 1.

Returning for the moment to the previously described action of the outgoing trunk selector of FIGS. 16 and 17, the binary counter in the lower right hand part of FIG. 17 counts each pulse (through gate 15BGA from the A amplifiers at the ring counter inputs) used to advance a ring counter, such as E57RC, during the search for an idle outgoing trunk. Referring to FIG. 33, it will be recalled that the first 15 μs. of the O3 time period is the maximum time permitted for outgoing trunk scanning: this is to reserve a minimum of 10 μs. for crosspoint closure. If, in FIG. 17, no ring counter finds a suitable idle outgoing trunk by the time the ring counter has taken 15 steps (15 μs.), the binary counter will have been placed in the condition (by 15 successive pulse inputs to the first stage) where each of the outputs 1 of the four stages has been changed from 24 v. D.C. to 8 v. D.C. If this condition prevails, after about a 1 μs. delay in delay line DL17 (to allow trunk selection in the event that the 15th scanned trunk is idle) the gate 15BGB will produce a positive going output, which is regenerated by the A amplifier as a positive pulse used to reset the entire outgoing trunk selector, including the binary counter. It will be noted, in FIG. 17, that the resetting of the selector by a pulse on lead TSR (resulting from having selected an idle outgoing trunk) will also reset the binary counter.

*Switching network operation*

As the result of the outgoing trunk selector circuit of FIGS. 16 and 17 having found an idle outgoing trunk A1 of FIG. 15, (1) the crosspoint network of FIG. 11 is controlled to interconnect incoming trunk 1 of FIGS. 3 through 6 with outgoing trunk A1 of FIG. 15, (2) the incoming trunk 1 is set for code transmission, and (3) the outgoing trunk A1 is made "busy" to the outgoing trunk selector.

In FIG. 16, the A amplifier connected to lead CP–A1 will cause a "positive" current to flow in the top horizontal row of coils of FIG. 11 corresponding to outgoing trunk A1 of FIG. 15. This circuit may be traced from 8 v. D.C. on conductor CP–A1 in FIG. 16, over lead CP–A1, through FIG. 15 into FIG. 11, thence through the outgoing trunk A1 coils in series, and to 24 v. D.C. This current will flow for the length of time determined by the width of the pulse output regenerated by the A amplifier of FIG. 16. Since the "positive" current has been sustained by incoming trunk 1 in its coils of FIG. 11 (right hand vertical row), the concurrence of these currents at the upper right hand crosspoint in FIG. 11 will cause this crosspoint to close, thereby interconnecting incoming trunk 1 with outgoing trunk A1.

Responsive to the closing of the upper right hand crosspoint of FIG. 11, connecting incoming trunk 1 to outgoing trunk A1, (1) the incoming trunk is set into a condition to process transmitted data, (2) the coil energization of FIG. 11 is terminated, and (3) the outgoing trunk A1 is made "busy" to the outgoing trunk selector of FIGS. 16 and 17.

When the upper right hand crosspoint of FIG. 11 closes, lead CPH–1 is changed from 24 v. D.C. to 8 v. D.C. In the incoming trunk 1 of FIGS. 3 through 6, this positive going change on lead CPH–1 causes gate TRWNG of FIG. 3 to inhibit any subsequent restorage of destructively read-out digits, enables gate TROGB in FIG. 3 to pass transmitted digits, causes gates TWNG1 and TWNG2 of FIG. 3 to inhibit further reading of incoming data, enables gates RAG and BRCG to permit read-out and transmission of address code digits, arranges the steering gates of FIGS. 5 and 6 so that read-out control on leads RO–1 through RO–7 is enabled and write-in control on leads WN–1 through WN–7 is prevented, and resets flip-flops SVC FF and TCPS FF of FIG. 4. The resetting of SVC FF removes from the read-out control of FIG. 12 the service request from incoming trunk 1. The resetting of TCPS FF removes vertical coil energization from FIG. 11. The removal of concurrent horizontal and vertical coil energization from FIG. 11 leaves the upper right hand crosspoint closed under control of magnetism retained in the crosspoint structure: the crosspoint is releasable by a "negative" or reverse current in either coil.

When the upper right hand crosspoint of FIG. 11 closes, lead BY–A1 is changed from 24 v. D.C. to 8 v. D.C. In FIG. 16, this causes gate TBG–A1 to inhibit pulses, thus indicating that outgoing trunk A1 is busy.

Also, the crosspoint closure interconnects the corresponding leads DAT–1, DAT–A1 and SIG–1, SIG–A1 of the interconnected trunks 1 of FIG. 3 and A1 of FIG. 15.

*Processing transmitted address code*

The address code 1011010, restored in the twistor of FIG. 13 incident to the destructive parallel code read-out operation, is available for tranmisssion over the completed crosspoint network connection (FIG. 11) between incoming trunk 1 of FIGS. 3 through 6 and outgoing trunk A1 of FIG. 15. As will be recalled from the foregoing discussion leading up to the actual trunk interconnection, the following conditions prevail: (1) lead CPH–1 from the network of FIG. 11 into incoming trunk 1 in FIG. 3 has adjusted incoming trunk for transmission of the code; (2) lead BY–A1 from the network into FIG. 16 has made outgoing trunk A1 "busy" to the outgoing trunk selector of FIGS. 16 and 17; (3) the address code 1011010 is stored in the twistor of FIG. 13; and, (4) incoming trunk 1 has been conditioned (gates TWNG1 and TWNG2 of FIG. 3) to be non-responsive to signals on lead DAT–1.

It will now be assumed (see FIGS. 31, 32 and 33) that the scan control of FIG. 10 has finished the O2 (and O3) time period and has begun the O1 time period wherein all incoming trunks 1 through 90 are again scanned.

The read-out control of FIG. 12 will have been reset (gate RORG) when an incoming trunk service request was detected (pulse on lead TCP–1 through TCP–90) or when the O3 time period began (pulse on lead O3 from FIG. 10), whichever occurred first.

The outgoing trunk selector of FIGS. 16 and 17 will have been reset when an outgoing trunk was selected (gate TSRG of FIG. 16) or when the binary counter of FIG. 17 had counted up to 15 ring counter input pulses (gate 15BGB of FIG. 17), whichever occurred first.

When the scan control of FIG. 10 causes a pulse to be applied to lead SCN–1 during the 5 μs. time slot for incoming trunk 1, the first address code digit (binary one) will be read from the twistor of FIG. 13 and transmitted over outgoing trunk A1 of FIG. 15. The pulse on the lead SCN–1 extends into FIG. 5 where it appears at one input to the AND gate BCCG–1 awaiting the setting of the BC FF marking the bit position of the first bit to be processed. The scan pulse on lead SCN-1 also extends into FIG. 3 where it appears as the input to the gate RAG. Gate RAG is enabled by the 8 v. D.C. on lead CPH-1 from the crosspoint network of FIG. 11; and, the scan pulse passes through gate RAG to set the read-out flip-flop RO FF.

The AND gate TBRG provides a positive pulse output at the leading edge of that pulse which is first of those supplied from the output of RO FF and the local trunk bit rate oscillator TBR-1 OSC. The latter cannot exceed the 2000 per second recurrence rate of the scan pulse on lead SCN-1; but, within this limitation, the pulse rate of the TBR-1 OSC can vary randomly throughout the incoming trunks and is independent of incoming bit rates. Thus, gate TBRG will provide output pulses (*a*) within the 5 $\mu$s. time slots assigned to incoming trunk 1 but (*b*) at the rate of the local bit rate oscillator TBR-1 OSC. These output pulses from gate TBRG define the bit positions of transmitted digits, the code 1011010; and, each output pulse from gate TBRG resets RO FF.

The first pulse from gate TBRG passes through gate ROCG to lead BC-1, and thence into FIG. 5 where it sets BC FF. The output pulse from BC FF, coinciding with the scan pulse on lead SCN-1, causes an output pulse from gate BCCG-1, which resets BC FF and sets the first stage BC1 of the binary counter to condition 1. The setting of BC1 to its 1 condition, as hereinbefore described, causes the bit 1 read-out gate ROG1 of FIG. 5 to provide a positive pulse through its associated A amplifier and gate STRG1, to read-out lead RO-1, into FIG. 12, through the A amplifier, R12B, and C12B, to bit wire BIT1 into FIG. 13. This positive half half power pulse on bit wire BIT1 will, in concurrence with a positive half power pulse on word solenoid S1, cause read-out of the first stored bit.

Returning to FIG. 3, the first positive pulse on lead BC-1 also passes through gate BRCG and through the A amplifier BRCA, to R1B and to one input of the AND gate BCG. Since the other input to gate BCG is the scan pulse on lead SCN-1, gate BCG will provide positive pulses to inputs of gates TROGA and TROGC through delay line DL3A. In the meantime, the positive pulse applied to R1B, passes through C1B to lead TWN-1 into FIG. 13, where it causes the A amplifier to apply a half power positive pulse to solenoid S1.

With half power pulses applied, in FIG. 13, to word solenoid S1 and to bit wire BIT1, the binary one stored in the first bit position is destructively read-out by the A read-out amplifier in FIG. 13 as a positive pulse on lead WN-1. This pulse extends via lead WN-1 into FIG. 14 and through the OR gate TRO to conductor TRO extending to all incoming trunk circuits of FIGS. 3 through 9. In FIG. 3, the positive pulse on lead TRO inhibits gate TROGC and, being concurrent with the pulse from delay DL3A (delayed to correspond with the inherent read-out delay of the twistor), causes gate TROGA to produce a positive pulse output, the latter being applied through the enabled gate TROGB to lead DAT-1. This positive pulse on lead DAT-1 extends into FIG. 11, over the closed crosspoint (upper right hand), and over lead DAT-A1 into the outgoing trunk A1 of FIG. 15 where it is converted by the line signal modulator into a spurt of frequency $f1$ and transmitted over leads T1 and R1 to the next switching center.

Figure 6:
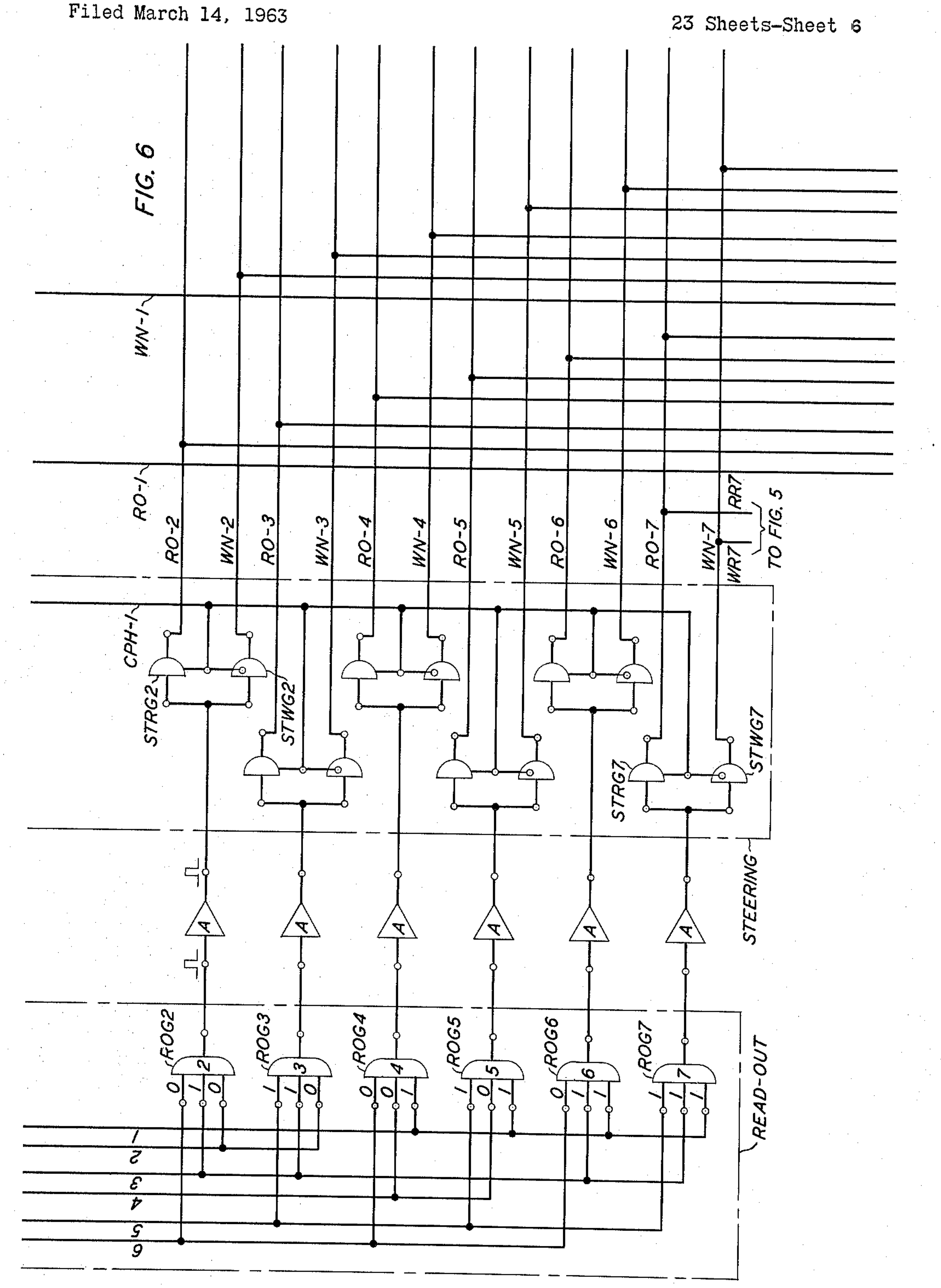
Figure 7:
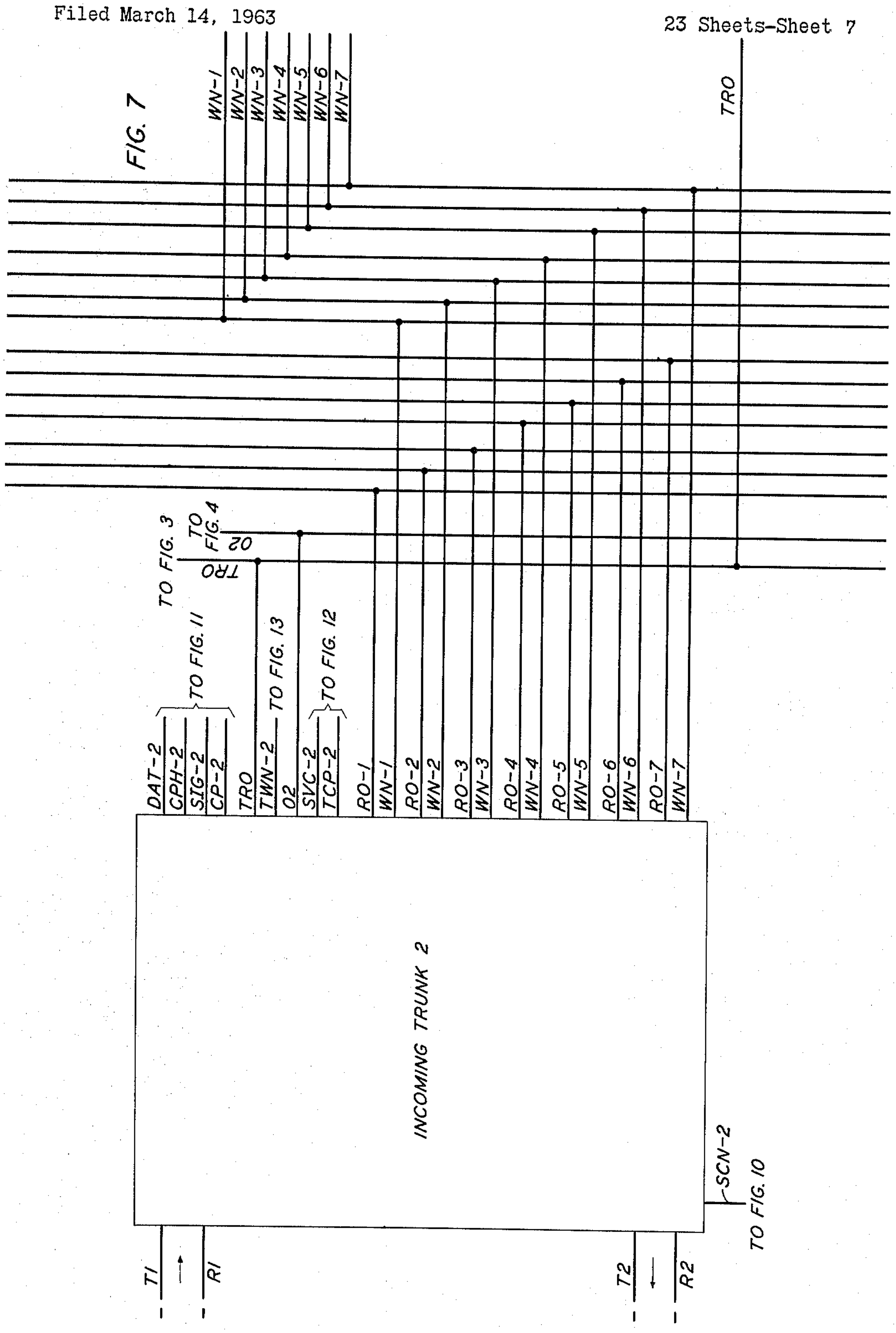
Figure 8:
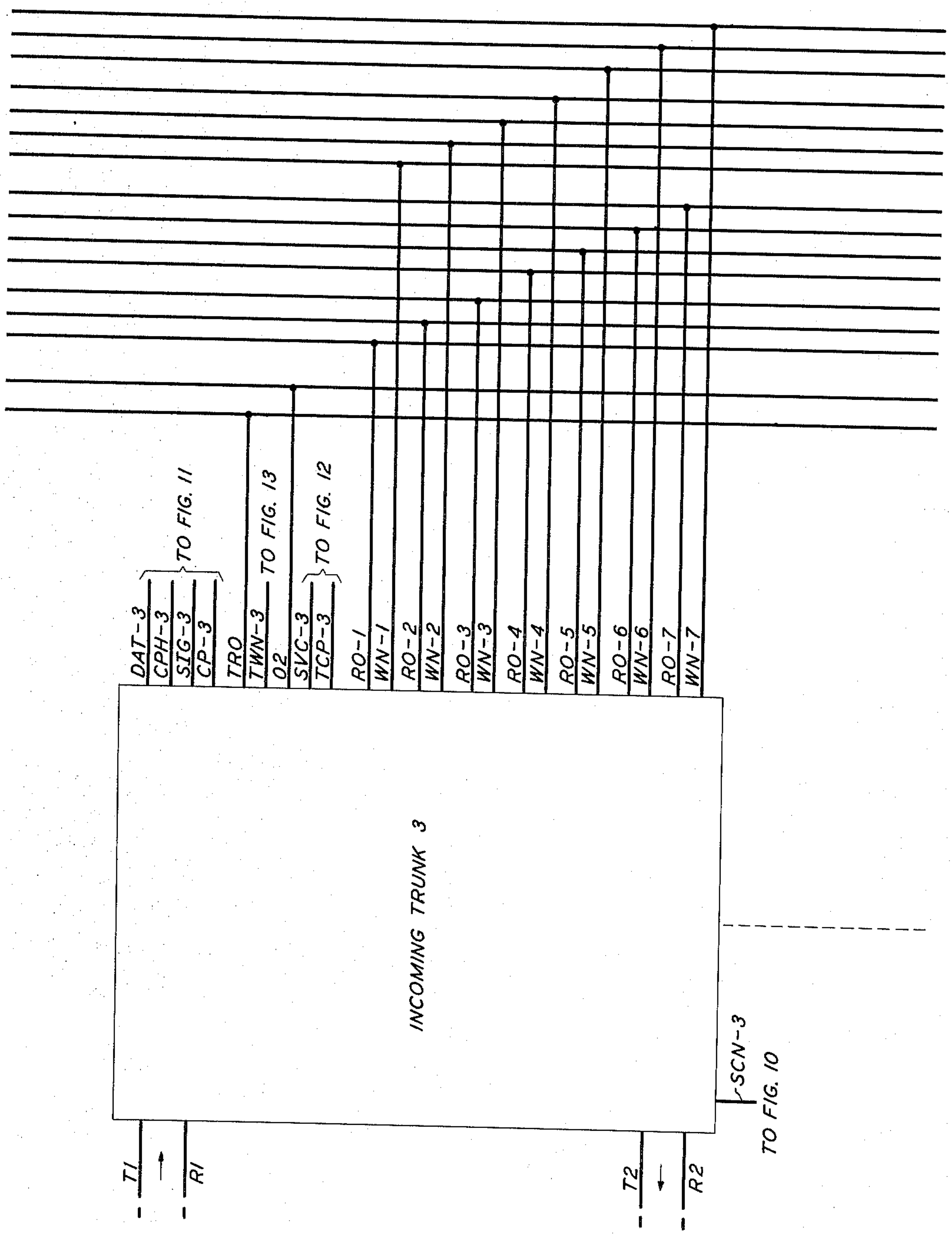
Figure 9:
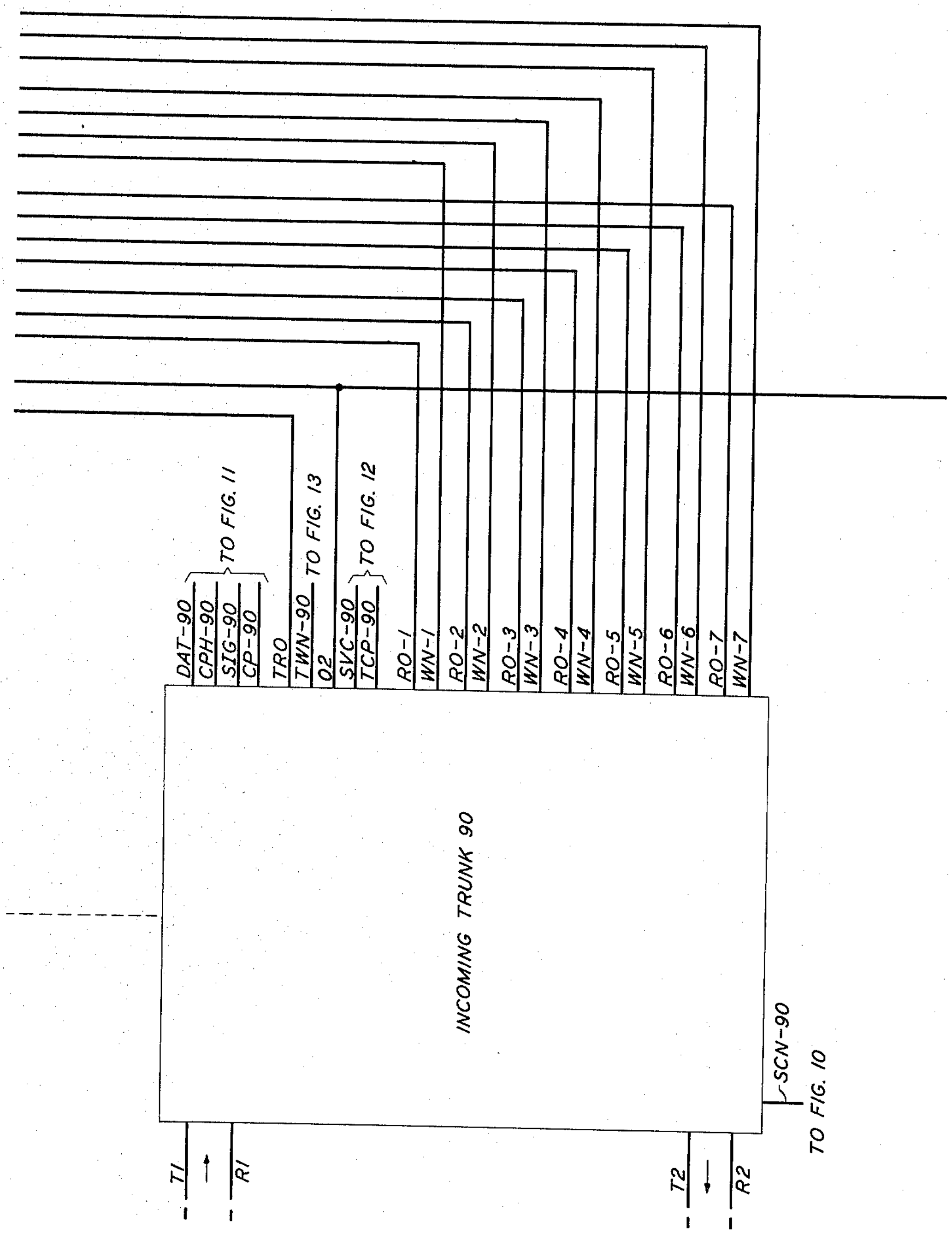

The next time the scan pulse is applied to lead SCN-1 by the scan control of FIG. 10, incoming trunk 1 will cause its binary counter of FIG. 5 to place stage BC1 at zero and stage BC2 at one, thus representing a count of two bits. The output of read-out gate ROG2 of FIG. 6 is applied through the read-out steering gate STRG2 of FIG. 6, over conductor RO-2 into FIG. 13, and to bit wire BIT2 as a positive half power current pulse. Concurrently therewith, as explained above in detail, a positive half power current pulse is applied to the word solenoid S1 of FIG. 13. Thus, the second stored binary digit zero is read-out. Being zero, this digit does not provide a positive output pulse to the gate TRO of FIG. 14: thus, no control pulse appears on lead TRO extending into FIG. 3. With no positive pulse on lead TRO in FIG. 3, the gate TROGA cannot pass a positive pulse to lead DAT-1: instead, the positive pulse output from DL3A is passed through gate TROGC (not inhibited since lead TRO does not carry a positive inhibiting pulse), where it is regenerated by the B amplifier as a negative pulse applied to lead DAT-1. This negative pulse is extended through the closed crosspoint of FIG. 11 and over lead DAT-A1 into FIG. 15 where the line signal modulator converts it to a spurt of frequency $f2$ and transmits this "binary zero" to the next switching center.

In like manner, the remaining five binary address code digits are destructively read from the twistor of FIG. 13 and transmitted over outgoing trunk A1 of FIG. 15 to the next switching center.

Upon the reading-out and transmission of the seventh, or last binary digit, the incoming trunk 1 of FIGS. 3 through 6 is set for message transmission. In FIG. 6, when the read steering gate STRG7 applies a positive pulse to lead RO-7 (for reading the seventh bit from the twistor of FIG. 13), this pulse is applied to lead RR7 extending into FIGS. 5 and 3. In FIG. 5, the pulse on lead RR7 extends through gate RWRG to reset the binary counter of FIG. 5. In FIG. 3, the pulse on lead RR7 sets flip-flop ROC FF to cause gate ROCG to inhibit further control by the local bit rate oscillator TBR-1 OSC.

In the present status of incoming trunk 1, the following conditions prevail: (1) the ROC FF is set to prevent the TBR-1 OSC from exercising control; (2) the binary counter of FIG. 5 has been reset; and, (3) gates TWNG1 and TWNG2 of FIG. 3 are inhibited to prevent control over incoming trunk 1 by signals which may appear on lead DAT-1.

Connections exist between incoming trunk 1 (FIG. 3) and outgoing trunk A1 (FIG. 15) whereby message and control signals may be passed one way over leads DAT-1 and DAT-A1 and the other way over leads SIG-1 and SIG-A1.

At this point, three signaling conditions should occur chronologically in the following order: (1) a suitable transmission start signal should be received from the terminating end of the connection over leads T2 and R2 into the outgoing trunk A1 of FIG. 15 and passed rearward towards the originating end of the connection to cause the originating office to start the transmission of the message; (2) following the message start signal, the originating or rearward end of the connection should transmit signals representing the message; and, (3) at a suitable time after the transmission of the message, the terminating or forward end of the connection should transmit to the outgoing trunk circuit A1 of FIG. 15, a suitable "release" signal which will result in the release of the connection through the switching network of FIG. 11.

*Message transmission start signal*

It is assumed, for purposes of the exemplary embodiment, that the message start signal, as well as the connection release signal (both of which are transmitted from the terminating or forward end of the connection back to the outgoing trunk circuit A1 of FIG. 15), consists of a set of four consecutive binary digits. The release detector of the incoming trunk 1, as shown in the left hand portion of FIG. 4, is arranged to respond, as will be described in detail hereinafter, to only a specific combination (0110) of binary digits. The circuitry shown in the right hand portion of FIG. 4 is in substance a four-digit counter which will reset itself and the release detector every time four consecutive binary digits appear on lead SIG–1 of incoming trunk 1; and, this insures that the release detector of FIG. 4 is always in proper condition to receive and to detect a legitimate release signal 0110.

From the above, it is apparent that the message start signal may be any combination of four consecutive binary digits other than the specific release signal 0110. As will be recalled from previous discussion, binary ones will arrive at outgoing trunk circuit A1 of FIG. 15 as spurts of frequency $f1$ and are converted by the line signal demodulator into positive pulses on lead SIG–A1, which extends into FIG. 11, over the closed crosspoint (upper right hand corner), thence over lead SIG–1 into FIG. 3. Also, binary zeros will be received as spurts of frequency $f2$ by outgoing trunk A1 of FIG. 15 and are converted by the line signal demodulator into negative pulses on lead SIG–A1 extending into FIG. 11, over the closed crosspoint, and into the incoming trunk 1 of FIG. 3 on lead SIG–1.

In FIG. 3 the successive pulses on lead SIG–1 are converted by the line signal modulator and repeated rearward to the originating end of the connection as appropriate spurts of frequency $f1$ and $f2$, the machinery at the originating end eventually receiving this signal and acting accordingly to transmit the message to incoming trunk 1 over leads T1 and R1 of FIG. 3. In the meantime, the four pulses appearing on lead SIG–1 in FIG. 3 are extended into FIG. 4 as input pulses to both the release detector and the four-digit counter.

Considering the four-digit counter at the right side of FIG. 4, each pulse, whether positive or negative, will be regenerated by the A or C amplifier as a positive pulse applied to the input of the OR gate BCCG–2 and thence to the set lead of FF1 FF and to the input leads of the gates CG–2, CG–3 and CG–4. The first pulse will set FF1 FF, the output of which will enable gate CG–2 to allow the second pulse to set FF2 FF. The output of FF2 FF likewise will allow gate CG–3 to cause the third pulse to set FF3 FF, the output of which, in turn, will allow gate CG–4 to pass the fourth pulse for the setting of FF4 FF. When FF4 FF is set, its output conductor produces a positive pulse through delay line DL4B which causes the resetting of the entire four-digit counter.

It will be noted in FIG. 4 that the output pulse from DL4B, in addition to resetting the four-digit counter, will cause the resetting of the release detector of FIG. 4. The delay imposed by DL4B is to insure that the release detector has sufficient time to exercise its proper function (to be explained in detail hereinafter) before being forcibly reset by the four-digit counter. While the four-digit counter is performing as above described the release detector in the left portion of FIG. 4 will undoubtedly have partially responded since it is entirely possible that the message start signal will contain at least two, and possibly three digits arranged in the proper order. However, in no event, will the release detector of FIG. 4 be fully responsive so as to cause a premature release of the connection due to the presence of message start pulses on lead SIG–1 of incoming trunk 1.

As a result of foregoing description concerning the message start signal, the release detector and four-digit counter of FIG. 4 will have been reset into their initial conditions and the message start signal will have been repeated by incoming trunk 1 over leads T2 and R2 rearward to the originating terminal of the connection.

*Transmission of message*

Eventually the originating terminal of the connection will receive the aformentioned start signal and will, in response thereto, transmit whatever signals comprise the message to be sent. As has been discussed above, the gates TWNG1 and TWNG2 of FIG. 3, being in their inhibiting conditions, will prevent incoming trunk 1 from responding to any data pulses appearing at the output of the line signal demodulator on lead DAT–1. Such data pulses as may comprise the message will therefore be transmitted over lead DAT–1 in FIG. 3, thence into FIG. 11, and over the closed crosspoint to lead DAT–A1 into outgoing trunk A1 of FIG. 15, where these positive and negative pulse data bits are converted by the line signal modulator into spurts of appropriate frequencies $f1$ and $f2$ transmitted forward over leads T1 and R1.

It is assumed, for purposes of the present exemplary embodiment, that leads T2 and R2 of FIG. 15, arranged to receive transmission rearward from the terminating end of the connection, will not carry data signals: these leads, as discussed to some extent hereinbefore, will carry only such control signals as are necessary to coordinate the message starting control and the crosspoint network release control.

*Release of connection*

At a suitable time, subsequent to transmission of the message, a release signal will be transmitted rearward from the terminating end of the connection. This signal is received over leads T2 and R2 in FIG. 15, converted by the line signal demodulator into positive and negative pulses on lead SIG–A1, and extended over lead SIG–A1 into FIG. 11 and over the closed crosspoint to lead SIG–1 extending into the incoming trunk 1, of FIGS. 3 through 6. It will be noted, in FIG. 3, that the release signal pulses appearing on lead SIG–1 will be converted by the line signal modulator back into appropriate spurts of frequencies $f1$ and $f2$ and transmitted over leads T2 and R2 rearward toward the originating end of the connection. It will also be noted, in FIG. 4, that the positive and negative pulses comprising the four-digit release code or signal and appearing on lead SIG–1 will affect both the release detector at the left in FIG. 4 and the four-digit counter at the right in FIG. 4.

As has been discussed above, the four-digit counter in FIG. 4 will respond to four successive pulses (regardless of polarity) of the release signal thereby to produce at the output of delay line DL4B a positive reset pulse at a time delayed shortly after the response of this circuit to the four pulse. As mentioned above, such action will completely reset all of the circuitry of FIG. 4.

The release detector circuit, at the left in FIG. 4, is arranged, as a specific example, to be responsive only to a specific release code consisting of four binary digits in the order 0110. These digits are manifested on lead SIG–1 as four pulses being respectively negative-positive-positive-negative. The first negative pulse will be regenerated in the uppermost C amplifier to a positive going pulse which sets FT FF, which, in being set, enables gate SDG to pass a positive pulse. The second pulse, being positive, is passed through gate SDG to set flip-flop SD FF, which thereupon enables gate TDG to pass the third pulse, which is positive. The third pulse thereupon sets flip-flop TD FF, enabling gate FHG. Due to the presence of the second C amplifier the gate FHG is arranged to pass the next pulse only if it is a negative pulse (regenerated by the amplifier as a positive pulse output). The fourth pulse, being negative, sets flip-flop FH FF which produces a positive pulse output. The positive pulse output from FH FF is regenerated by the B amplifier as a negative pulse output which is applied through the condenser C4 to conductor CP–1 extending into FIG. 3 and thence into FIG. 11 where it produces a negative, or reverse current pulse in the right hand vertical crosspoint windings associated with incoming trunk 1. The operated crosspoint (upper right hand corner of FIG. 11), as has been mentioned previously, will be released in response to this negative, or reverse current, thereby to disconnect incoming trunk 1 from outgoing trunk A1. In the meantime, in FIG. 4, the positive pulse output from FH FF is passed through delay line DL4A and through gate RLSG to reset the release detector: by the same token, the four-digit counter at the right in FIG. 4, which also will have responded to the four-digit release signal, will apply a positive pulse output from its delay line DL4B to reset itself and to apply a reset pulse through gate RLSG to reset the flip-flops in the release detector. The delay lines DL4A and DL4B are provided to insure that the resetting of the circuitry in FIG. 4 does not occur until an interval of time sufficient to enable the negative pulse on lead CP–1 to cause the release of the closed crosspoint associated with incoming trunk 1.

It is understood that the above-described arrangement is merely illustrative of the many specific embodiments which can represent applications of the principles of the invention. Numerous and varied other arrangements can readily be devised by those skilled in the art in accordance with these principles without departing from the spirit and scope of the invention.

What is claimed is:

1. In a communication system wherein lines are arranged to receive and to transmit data represented by serially related electrical pulses:
  (1) a plurality of lines each comprising
    (a) means responsive to received data pulses for generating successive incoming control pulses corresponding in time occurrence to successive received data pulses where said incoming control pulse occurrence rate is randomly variable from line to line,
    (b) and means for generating local control pulses at an occurrence rate local to and individual to said line and independent of said incoming control pulse rate where said local pulse occurrence rate is randomly variable from line to line;
  (2) means common to said lines for generating different-discrete-time-slot control pulses for different lines,
    (a) each said common control pulse being of a given pulse width interval,
    (b) and the time-slot recurrence rate being at least as fast as the fastest of said incoming and local pulse rates;
  (3) and, means in each line controlled by said three generating means for causing said line
    (a) to process received data pulses only during its individual time-slot but at the said incoming pulse rate,
    (b) and to process transmitted data pulses only during its individual time-slot but at the said local pulse rate.

2. The invention defined in claim 1 wherein said causing means comprises
  (1) means for alternatively setting said line in a receiving and in a transmitting condition,
  (2) means controlled by said line when in a receiving condition to cause said line to process received data pulses under the joint control of said incoming and common control pulse generating means,
  (3) and means controlled by said line when in a transmitting condition to cause said line to process transmitted data pulses under the joint control of said local and common control pulse generating means.

3. In a communication system wherein lines are arranged to receive and to transmit data represented by serially related electrical pulses:
  (1) a plurality of lines each comprising
    (a) dual-condition means
      (i) settable in one condition to adjust said line for processing received data pulses,
      (ii) and settable in the other condition to adjust said line for processing transmitted data pulses,
    (b) means responsive to received data pulses under the control of said dual-condition means when set in its said one condition for generating an incoming control pulse corresponding in time to each received data pulse position where said incoming control pulse occurrence rate is randomly variable from line to line,
    (c) and means under the control of said dual-condition means when set in its said other condition for generating local control pulses at an occurrence rate local to and individual to said line and independent of said incoming control pulse rate where said local pulse occurrence rate is randomly variable from line to line;
  (2) means common to said lines for generating different-discrete-time-slot control pulses for different lines,
    (a) each said common control pulse being of a given pulse width interval,
    (b) and the time-slot recurrence rate being at least as fast as the fastest of said incoming and local control pulse rates;
  (3) means in each line controlled jointly by said common control pulse generating means and by said incoming control pulse generating means to cause said line to process received pulses only during its individual time-slot but at the said incoming control pulse rate;
  (4) and, means, in each line controlled jointly by said common control pulse generating means and by said local control pulse generating means to cause said line to process transmitted data pulses only during its individual time-slot but at the said local control pulse rate.

4. The invention defined in claim 3
  (1) wherein storage means is provided common to said lines;
  (2) wherein each line includes
    (a) a pulse counter controlled alternatively by said incoming control pulse generating means and by said local control pulse generating means to determine successive pulse positions of respective alternatively received and transmitted data pulses,
    (b) and means for detecting the values of received data pulses;
  (3) wherein said receive-causing means is controlled by said counter and by said detecting means to store in said storage means received data pulses according to pulse position and pulse value;
  (4) and, wherein said transmit-causing means is controlled by said counter to read from said storage means stored data pulses according to pulse position and pulse value.

5. In a communication system wherein lines are arranged to receive and to transmit codes represented by sets of serially related electrical pulses:
  (1) a plurality of lines each comprising
    (a) means responsive to received code pulses for generating incoming control pulses at the same rate at which said code pulses are received where said incoming control pulse rate is randomly variable throughout said lines,
    (b) and means for generating local control pulses at a rate local to and individual to said line and independent of said incoming control pulse rate where said local control pulse rate is randomly variable throughout said lines;
  (2) means common to said lines for generating different-discrete-time-slot control pulses for different lines and at a time-slot recurrence rate at least as fast as the fastest of said incoming and local control pulse rates;
  (3) storage means common to said lines;
  (4) means in each line controlled by said common control pulses and by said incoming control pulses for causing said line to store received code pulses in said storage means only during the time-slot individual to said line but at the said incoming control pulse rate;

(5) and, means in each line controlled by said common control pulses and by said local control pulses for causing said line to transmit stored code pulses from said storage means only during the time-slot individual to said line but at the said local signal rate.

6. The invention defined in claim 5

(1) wherein each said code is a multi-bit serial binary code;

(2) wherein said incoming control pulse rate generating means comprises means for detecting bit positions and bit values of successively received binary code bits;

(3) wherein said local control pulse rate generating means comprises a local bit rate oscillator for generating bit pulses at said oscillator rate;

(4) wherein said storing means is controlled by said detecting means to store successively received binary code bits according to bit value and serial bit position;

(5) and, wherein said transmitting means is controlled by said oscillator to transmit stored binary code bits according to bit value and serial bit position.

7. The invention defined in claim 6

(1) wherein said detecting means comprises
  (a) means for generating an incoming bit control pulse for each received bit position,
  (b) and means for detecting the bit value of each received bit;

(2) wherein each line includes a binary bit counter operable to count bit positions;

(3) wherein each line includes dual-condition means settable in one condition to cause said counter to count incoming bit control pulses and settable in the other condition to cause said counter to count oscillator bit pulses;

(4) wherein said storing means is controlled by said counter when said settable means is set in its said one condition;

(5) and, wherein said transmitting means is controlled by said counter when said settable means is set in its said other condition.

8. In a communication system wherein lines are arranged to receive and to transmit serial binary data bits represented by serially related electrical binary pulses:

(1) a plurality of lines each comprising
  (a) means controlled by received data bits for generating incoming control pulses corresponding in time occurrence to received data bits where said incoming control pulse rate is randomly variable from line to line,
  (b) and means for generating local control pulses at a pulse occurrence rate local to and individual to said line and independent of said incoming control pulse rate where said local control pulse rate is randomly variable from line to line;

(2) storage means common to said lines;

(3) means common to said lines for generating different-discrete-time-slot control pulses for different lines,
  (a) each said common control pulse being of a given pulse width interval,
  (b) and the time-slot recurrence rate per line being at least as fast as the fastest of said incoming and local control pulse rates;

(4) and, each line including means controlled by said common and incoming and local generating means
  (a) for storing received data bits in said storage means only during the corresponding line time-slot interval but at the said incoming control pulse rate,
  (b) and for transmitting stored data bits from said storage means only during the corresponding line time-slot interval but at the said local control pulse rate.

9. The invention defined in claim 8 wherein said storing-transmitting means comprises (1) dual-condition means
  (a) settable in one condition to adjust said line for storing data bits,
  (b) and settable in the other condition to adjust said line for transmitting data bits;

(2) and data processing circuitry selectively controlled by said dual-condition means
  (a) for storing data bits under the control of said incoming control pulse generating means,
  (b) and for transmitting data bits under the control of said local control pulse generating means.

10. The invention defined in claim 9

(1) wherein said processing circuitry includes
  (a) a binary bit counter,
  (b) counter control means effective when said dual-condition means is set in said one condition for causing said counter to count successive incoming control pulses and effective when said dual-condition means is set in said other condition for causing said counter to count successive local control pulses,
  (c) and storage access means controlled by said counter for respectively storing and transmitting successive data bits according to the rate at which said counter counts respective incoming and local control pulses.

11. In a communication system wherein lines are arranged to receive and to transmit serial binary data bits represented by serially related electrical binary pulses:

(1) a plurality of lines each comprising
  (a) means controlled by received data bits for generating incoming bit pulses corresponding in time occurrence to received data bits where said incoming bit rate is randomly variable from line to line,
  (b) means for generating local bit pulses at a pulse occurrence rate local to and individual to said line and independent of said incoming bit rate where said local bit rate is randomly variable from line to line,
  (c) a binary bit counter for counting successive bit pulses thereby to define successive bit positions,
  (d) and means for causing said counter to count incoming bit pulses when said line is receiving data bits and to count local bit pulses when said line is transmitting data bits;

(2) storage means common to said lines;

(3) means common to said lines for generating different-discrete-time-slot control pulses for different lines,
  (a) each said control pulse being of a given pulse width interval,
  (b) and the time-slot recurrence rate per line being at least as fast as the fastest of said incoming and local bit rates;

(4) and, each line including means controlled jointly by said control pulse generating means and by said counter
  (a) for storing received data bits in said storage means only during the corresponding line time-slot interval but at said incoming bit rate,
  (b) and for transmitting stored data bits from said storage means only during the corresponding line time-slot interval but at said local bit rate.

12. In a communication switching system wherein incoming lines are connectable to outgoing lines under the control of address codes arranged in serial digits represented by electrical signals serially received by incoming lines at random incoming signal rates:

(1) incoming lines;

(2) outgoing lines;

(3) a switching network common to said lines for interconnecting incoming lines with outgoing lines;
(4) said incoming lines including means individual thereto fore generating local control signals at signal rates local to individual incoming lines, independent of incoming signal rates, and randomly variable throughout said incoming lines;
(5) signal generating means common to said incoming lines for applying different-discrete-time-slot control signals to different incoming lines at a common signal recurrence rate at least as fast as the fastest of said incoming and local signal rates;
(6) and, means in each incoming line controlled at said common signal recurrence rate by said common generating means
 (a) for processing address code digital signals at the incoming signal rate of received signals whenever said incoming line is disconnected from any outgoing line,
 (b) and for processing address code digital signals at the local signal rate individual to said incoming line whenever said incoming line is connected with any outgoing line.

13. The invention defined in claim 12
(1) wherein said processing means comprises
 (a) receiving-processing means for processing received signals at said incoming signal rate,
 (b) and transmitting-processing means for processing transmitted signals at said local signal rate;
(2) wherein said receiving-processing means comprises
 (a) means effective under disconnect conditions for ascertaining the time positions of successive received digital signals,
 (b) and means controlled jointly by said ascertaining means and by said common generating means for evaluating successive received digital signals only during the time-slots individual to said incoming line but at the said incoming signal rate;
(3) and, wherein said transmitting-processing means comprises means controlled jointly by said local generating means and by said common generating means for transmitting digital signals only during the time-slots individual to said incoming line but at the said local signal rate.

14. In a communication switching system wherein incoming lines are connectable to outgoing lines under the control of address codes arranged in serial digits represented by electrical signals serially received by incoming lines at random incoming signal rates:
(1) incoming lines;
(2) outgoing lines;
(3) a switching network common to said lines for interconnecting incoming lines with outgoing lines;
(4) said incoming lines including means individual thereto for generating local control signals at signal rates local to individual incoming lines, independent of incoming signal rates, and randomly variable throughout said incoming lines;
(5) signal generating means common to said incoming lines for applying different-discrete-time-slot control signals to different incoming lines at a common signal recurrence rate at least as fast as the fastest of said incoming and local signal rates;
(6) receiving means in each incoming line controlled at said common signal recurrence rate by said common generating means whenever said incoming line is disconnected from any outgoing line for processing received address code digital signals at the incoming signal rate of said received signals;
(7) and, transmitting means in each incoming line controlled at said common signal recurrence rate by said common generating means whenever said incoming line is connected with any outgoing line for processing transmitted address code digital signals at the local signal rate individual to each said incoming line.

15. In a communication switching system wherein incoming lines are connectable to outgoing lines under the control of binary address codes arranged in serial binary bits represented by electrical bit pulses serially received by incoming lines at random incoming bit rates:
(1) incoming lines;
(2) outgoing lines;
(3) a switching network common to said lines for interconnecting incoming lines with outgoing lines;
(4) each incoming line including means individual thereto for generating local bit control pulses at a bit rate local to and individual to said incoming line and independent of said incoming bit rate, said local bit rates being randomly variable throughout said incoming lines;
(5) means common to said incoming lines for applying different-discrete-time-slot control pulses to different incoming lines at a common contral bit recurrence rate at least as fast as the fastest of said incoming and local bit rates;
(6) each incoming including means controlled by said network
 (a) for setting said incoming line in a receiving condition whenever said incoming line is disconnected from any outgoing line,
 (b) and for setting said incoming line in a transmitting condition whenever said incoming line is connected with an outgoing line;
(7) and, means in each incoming line controlled by said setting means and by said control pulse applying means
 (a) for processing received bit signals only during time-slots individual to said incoming line but at said incoming bit rate,
 (b) and for processing transmitted bit signals only during time slots individual to said incoming line but at said local bit rate.

16. The invention defined in claim 15
(1) wherein said incoming line processing means comprises
 (a) an incoming bit detector responsive to incoming bit signals for generating incoming bit control pulses at bit time positions of said incoming bit signals,
 (b) receiving circuitry controlled jointly by said incoming bit control pulses and by said common bit control pulses for processing received bit signals,
 (c) and, transmitting circuitry controlled jointly by said local bit control pulses and said common bit control pulses for processing transmitted bit signals.

17. The invention defined in claim 16
(1) wherein is provided storage means common to said incoming and outgoing lines, said storage means controllable
 (a) to cause bit signals to be stored therein,
 (b) and to cause bit signals to be read-out therefrom;
(2) wherein said receiving circuitry comprises means for causing serial storage in said storage means of serially received incoming bit signals;
(3) and, wherein said transmitting circuitry comprises means for causing stored bit signals to be serially read-out from said storage means.

18. The invention defined in claim 17
(1) wherein a full complement of received bit signals comprises an address code directing an interconnection;
(2) wherein said switching network is selectively energizable according to a to-be-connected pair of incoming and outgoing lines to interconnect said pair;

(3) wherein said receiving circuitry further comprises
(a) means controlled by said incoming bit detector to count successive incoming bit signals,
(b) means controlled by said counting means for causing parallel read-out from said storage means of a full complement of stored code bit signals,
(c) and, means effective incident to said parallel read-out operation for selectively energizing said network according to said incoming line;
(4) and, wherein selecting means is provided common to said outgoing lines and controlled by said storage means according to said full complement of code bit signals parallelly read-out from said storage means for selectively energizing said network according to an outgoing line represented by said full code.

19. In a communication switching system wherein an incoming line is connectable to an outgoing line under the control of an address code represented by a series of successive electrical signals received by said incoming line:
(1) incoming lines;
(2) outgoing lines;
(3) a switching network common to said lines and selectively energizable according to the identities of a to-be-connected pair of said lines to interconnect said pair;
(4) storage means common to said lines;
(5) outgoing line selecting means common to said outgoing lines;
(6) receiving means in each incoming line effective before said line is connected to an outgoing line
(a) for serially receiving successive incoming code signals,
(b) for serially storing said received signals in said storage means,
(c) for ascertaining when a full address code has been received,
(d) and for causing said full code to be parallelly read-out from said storage means for controlling said selecting means to identify an outgoing line suitable to be connected to said incoming line in accordance with said full address code;
(7) and, transmitting means in said incoming line effective after said incoming line is connected to said identified outgoing line for causing said full code to be serially read-out from said storage means and to be serially applied over said network connection to said connected outgoing line.

20. The invention defined in claim 19 wherein
(1) read-out from said storage means is destructive read-out;
(2) and, said receiving means includes restoring means effective incident to said parallel read-out to parallelly restore in said storage means said parallelly read-out code.

21. The invention defined in claim 19 wherein
(1) said serial receipt by said incoming line of incoming code signals is at a signal rate fixed by the incoming signal rate;
(2) said incoming line includes local signal rate generating means;
(3) and, said serial read-out and applying is at a signal rate fixed by said local generating means.

22. The invention defined in claim 21
(1) wherein is provided control signal generating means common to said incoming lines for applying different-discrete-time-slot control signals to different incoming lines at a repetition rate at least as fast as the fastest incoming signal rate and at least as fast as the fastest local signal rate;
(2) and, wherein said respective receiving and transmitting means of said incoming lines are controlled jointly by said common signal generating means but at respective ones of said incoming local signal rates.

23. The invention defined in claim 22
(1) wherein said receiving means is controlled on a time-division basis by said common generating means at said common signal rate for accomplishing its said receiving, storing and ascertaining functions at said incoming signal rate;
(2) and, wherein said transmitting means is controlled on a time-division basis by said common generating means at said common signal rate for accomplishing said read-out and applying functions at said local signal rate.

24. In a communication switching system wherein an incoming line is connectable to an outgoing line under the control of a code represented by electrical signals serially received by said incoming line where a full complement of code signals comprises a code directing an interconnection:
(1) a plurality of incoming lines;
(2) a plurality of outgoing lines;
(3) a switching network common to said incoming and outgoing lines and selectively operable according to the identity of a to-be-connected pair of lines to interconnect said pair over a network path;
(4) storage means common to said incoming and outgoing lines;
(5) said storage means controllable
(a) to cause code signals to be stored therein,
(b) and to cause code signals to be read-out therefrom;
(6) control signal generating means common to said incoming lines for selectively applying control signals to selected incoming lines;
(7) receiving means in each incoming line operable whenever a said control signal is applied to a disconnected said incoming line
(a) for detecting code signals serially received by said incoming line,
(b) for causing serial storage in said storage means of said detected signals,
(c) for ascertaining when a full complement of code signals has been detected,
(d) for causing parallel read-out from said storage means of said full complement of stored code signals,
(e) and for selectively operating said network according to the identity of said incoming line;
(8) and, selecting means common to said outgoing lines and controlled by said storage means according to said full complement of code signals read-out from said storage means for selectively operating said network according to the identity of an outgoing line represented by said full complement of code signals.

25. The invention defined in claim 24 wherein is provided transmiting means in each incoming line operable whenever a said control signal is applied to a connected said incoming line
(1) for causing serial read-out from said storage means of said stored code signals,
(2) and for causing said read-out code signals to be serially applied to a connected said outgoing line.

26. The invention defined in claim 25
(1) wherein each said outgoing line includes means for applying a release signal;
(2) wherein each said incoming line includes releasing means operable by a release signal;
(3) and, wherein said network connection of a pair of incoming and outgoing lines
(a) includes means whereby said supplying means of an outgoing line of a connected pair supplies a release signal to operate said releasing means of the incoming line of said connected pair, (b) and includes means controlled by said operated releasing means to disconnect said pair.

27. The invention defined in claim 24

(1) wherein said received code is a binary address code arranged in serial binary bits;

(2) and, wherein said incoming line receiving means (a) serially detects successive address code bits, (b) causes serial storage of said address code bits in said storage means, (c) ascertains when a full complement of address code bits has been detected, (d) and causes parallel read-out from said storage means of said full complement of address code bits.

28. The invention defined in claim 27 wherein is provided transmitting means in each incoming line operable whenever a said control signal is applied to a connected said incoming line (1) for causing serial read-out from said storage means of said stored address code bits, (2) and for causing said serially read-out address code bits to be serially applied to a connected said outgoing line.

29. The invention defined in claim 27

(1) wherein said address code bits are received over an incoming line at a line bit rate particular to said incoming line;

(2) wherein said signal generating means generates control signals in different-discrete-time-slots for different incoming lines;

(3) and, wherein said signal generating means generates said control signals at a repetition rate per incoming line at least as fast as the fastest incoming line bit rate.

30. The invention defined in claim 29 wherein is provided transmitting means in each connected incoming line controlled on a time-division basis by said signal generating means (1) for causing serial read-out from said storage means of said stored address code bits, (2) and for causing said serially read-out address code bits to be serially applied to connected said outgoing line.

31. The invention defined in claim 30 wherein said transmitting means includes bit rate control means for causing said serial bit read-out and said serial bit applying to occur at a bit rate not greater than said control signal repetition rate.

32. In a communication switching system wherein an incoming line is connectable to an outgoing line under the control of a binary address code arranged in serial binary bits represented by electrical signals serially received by said incoming line where a full address code comprises a code directing an interconnection:

(1) a plurality of incoming lines;

(2) a plurality of outgoing lines;

(3) a switching network common to said incoming and outgoing lines and selectively energizable according to the identity of a to-be-connected pair of lines to interconnect said pair over a network path;

(4) storage means common to said incoming and outgoing lines and comprising a memory portion and a control portion;

(5) said storage control portion controllable (a) to cause code bit signals to be stored in said storage memory portion (b) and to cause code bit signals to be read-out from said storage memory portion;

(6) control signal generating means common to said incoming lines for applying different-discrete-time-slot control signals to different incoming lines at a repetition rate at least as fast as the fastest bit rate at which said incoming lines receive said code bit signals;

(7) receiving means in each disconnected incoming line controlled on a time-division basis by said control signals from said signal generating means (a) for serially detecting successive address code bit signals serially received by said incoming line, (b) for controlling said storage control portion to cause serial storage in said storage memory portion of said detected bit signals, (c) for ascertaining when a full address code has been detected, (d) for controlling said storage control portion to cause parallel read-out from said storage memory portion of said full address code, (e) and for selectively energizing said network under the control of said storage control portion according to the identity of said incoming line;

(8) selecting means common to said outgoing lines and controlled by said storage control portion according to said parallel read-out address code for selectively energizing said network according to the identity of an outgoing line represented by said address code;

(9) and, transmitting means in each connected incoming line controlled on a time-division basis by said control signals from said signal generating means (a) for controlling said storage control portion to cause serial read-out from said storage memory portion of said stored address code bit signals, (b) for causing said serially read-out address code bit signals to be serially applied to a connected said outgoing line, (c) and for causing said serial bit signal read-out and said serial bit signal applying to occur at a bit rate not greater than said control signal repetition rate.

33. The invention defined in claim 32 wherein said receiving means comprises (1) means for detecting the serial position of each bit signal within each address code;

(2) means for identifying the binary value of each detected bit signal;

(3) means under the joint control of said detecting means and of said identifying means for controlling said storage control portion according to each bit signal position and binary value to cause serial storage in said storage memory portion of each bit signal;

(4) means controlled by said detecting means for ascertaining when bit signals have been received corresponding to all bit positions of a code;

(5) said storage control portion controlled by said ascertaining means to cause parallel read-out from said storage memory portion of said full address code;

(6) and, means controlled by said storage control portion incident to said parallel read-out operation for selectively energizing said network according to the identity of said incoming line.

34. The invention defined in claim 33 wherein said transmitting means comprises (1) bit rate control means for generating pulses at a rate not exceeding the repetition rate of said control signals from said signal generating means;

(2) means under the joint control of said pulse generating means, of said signal generating means, and of said interconnecting network for controlling said storage control portion to cause serial read-out at said pulse rate from said storage memory portion of said stored address code bit signals;

(3) and, means under the joint control of said pulse generating means, of said signal generating means, and of said interconnecting network for causing said serially read-out address code bit signals to be serially applied to a connected said outgoing line.

35. The invention defined in claim 34

(1) wherein said bit signal read-out is destructive read-out;

(2) and, wherein means is provided controlled by said interconnecting network for causing parallel read-out bit signals to be restored in parallel in said storage memory portion.

36. The invention defined in claim 35 wherein said restoring means is inhibited by said interconnecting network for restoring said signals during said serial bit signal read-out.

37. The invention defined in claim 34

(1) wherein said binary bit signals are positive pulses to represent binary ones and negative pulses to represent binary zeros;

(2) a said full address code consists of *n* binary pulses;

(3) said detecting means comprises a binary bit counter for counting bit signals regardless of polarity;

(4) said identifying means comprises a discriminator for discriminating between positive and negative bit signal pulses;

(5) and, said ascertaining means comprises an operable control device operated by said counter when *n* binary pulses are counted.

38. The invention defined in claim 37

(1) wherein bit signal read-out is destructive read-out;

(2) said interconnecting network connects said incoming line to an outgoing line only when selectively energized according to the identities of both said lines;

(3) and, means is provided controlled by said network during said parallel read-out operation and before said connection is established to cause said parallel read-out bit signals to be restored in parallel in said storage memory portion;

(4) said restoring means being inhibited by said network and rendered ineffective thereby to restore signals serially read-out after said connection is established.

39. The invention defined in claim 38 wherein (1) said bit rate pulse generating means comprises a bit rate oscillator the bit frequency of which does not exceed the said control signal repetition rate;

(2) the bit rate of serial detection and storage of incoming binary bit signals is fixed by the incoming bit rate;

(3) and, the bit rate of serial read-out and applying of outgoing binary bit signals is fixed by the bit rate frequency of said oscillator.

40. The invention defined in claim 39 wherein the said incoming bit rate and the said oscillator bit rate are independent of each other and are randomly variable from line to line.

No references cited.

ROBERT H. ROSE, *Primary Examiner.*

WILLIAM C. COOPER, *Examiner.*